(12) United States Patent
Suzuki

(10) Patent No.: US 8,029,348 B2
(45) Date of Patent: Oct. 4, 2011

(54) GAME APPARATUS AND STORAGE MEDIUM STORING A GAME PROGRAM

(75) Inventor: Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1550 days.

(21) Appl. No.: 10/989,467

(22) Filed: Nov. 17, 2004

(65) Prior Publication Data

US 2005/0119050 A1   Jun. 2, 2005

(30) Foreign Application Priority Data

Nov. 28, 2003   (JP) ................................ 2003-398959

(51) Int. Cl.
*A63F 13/00* (2006.01)

(52) U.S. Cl. ......... 463/7; 463/6; 463/8; 463/23; 463/32; 463/33

(58) Field of Classification Search ............. 463/1–9, 463/23, 29–31, 36–44, 46, 50; 434/11; 273/440, 273/440.1, 441
See application file for complete search history.

(56) References Cited

U.S. PATENT DOCUMENTS

| | | | |
|---|---|---|---|
| 6,347,994 B1 | 2/2002 | Yoshikawa et al. | |
| 6,729,954 B2 * | 5/2004 | Atsumi et al. | 463/7 |
| 6,736,724 B1 * | 5/2004 | Erikawa et al. | 463/7 |
| 2002/0045470 A1 * | 4/2002 | Atsumi et al. | 463/1 |
| 2002/0142834 A1 * | 10/2002 | Sobue | 463/30 |
| 2002/0183113 A1 * | 12/2002 | Takahashi et al. | 463/42 |
| 2003/0208535 A1 * | 11/2003 | Appleman et al. | 709/203 |

FOREIGN PATENT DOCUMENTS

| | | | |
|---|---|---|---|
| JP | 2001-149655 | * | 6/2001 |
| JP | 2001-276432 | * | 10/2001 |

OTHER PUBLICATIONS

Dengeki Games (Media Works Inc), Apr. 1, 2003 issue, p. 13, with an English translation of the lower column of p. 13.
Second printing of 'Dorimaga Books Phantasy Star Online Ultimate' (Softbank Publishing Inc., Mar. 14, 2002: 202-203).
'Terekuresuta Kanzen Koryaku Technique Book' (Tokuma Communications Co. Ltd., Nov. 1, 1986: 22-24).
'Gradius Hissho Koryakuho' (Futaba Publishers Ltd., Jun. 22, 1986: 11).

* cited by examiner

*Primary Examiner* — Peter DungBa Vo
*Assistant Examiner* — Sunit Pandya
(74) *Attorney, Agent, or Firm* — Nixon & Vanderhye P.C.

(57) ABSTRACT

A game apparatus includes a video game machine. A CPU provided in the video game machine controls movements, etc. of a player character operated by a player. There exist a predetermined number of player characters (e.g., four persons), and all of them are assigned to players depending on the number thereof. For example, four player characters are assigned to one player in a 1P mode, and two player characters each are assigned to two players in a 2P mode. While playing a game, each player may change formations of the four player characters or plunder a player character existing in an array belonging to another player.

8 Claims, 24 Drawing Sheets

FIG. 4
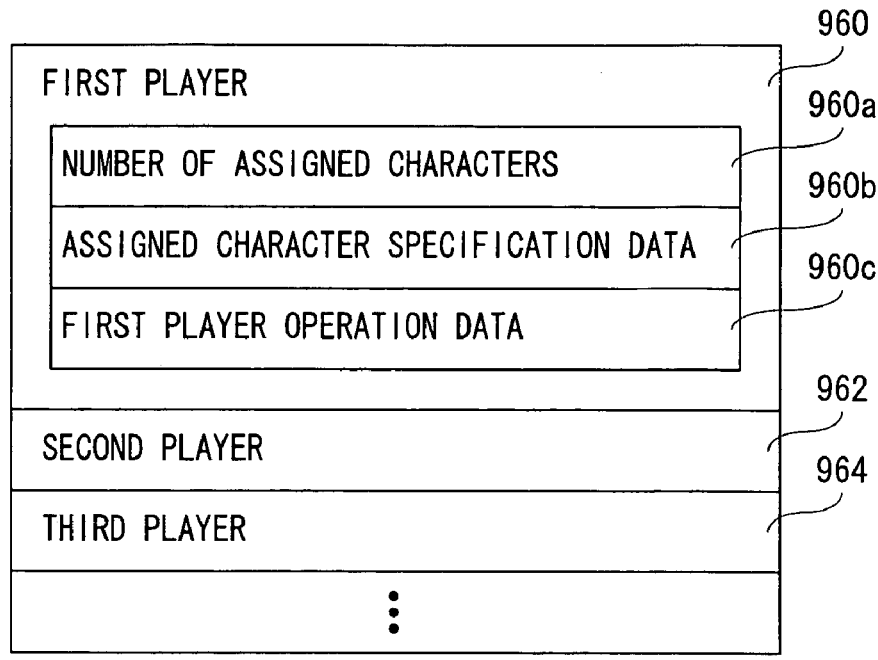
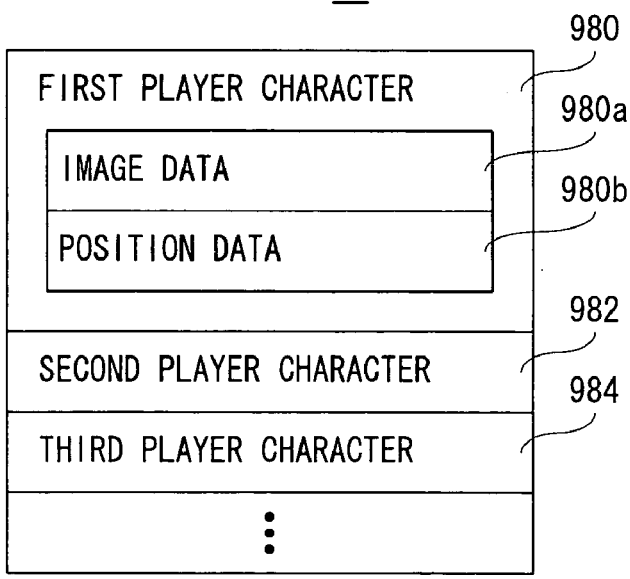

GAME APPARATUS AND STORAGE MEDIUM STORING A GAME PROGRAM

TECHNICAL FIELD

The exemplary illustrative embodiments herein relate to a game apparatus and a storage medium storing a game program. More specifically, the exemplary embodiments herein relate to a game apparatus comprising at least one operating means, a game processing means and a display means, and to a storage medium storing a game program, for playing an action game including attacking an enemy and defending against the enemy by directly operating a predetermined number of player characters in real time, rather than by inputting a command or selecting a message.

BACKGROUND AND SUMMARY

One example of a conventional game apparatus is disclosed in a second printing of 'Dorimaga Books Phantasy Star Online Ultimate' (Softbank Publishing Inc., Mar. 14, 2002: 202-203). This network action role-playing game (network action RPG) offers an event in which players who have met on a network cooperate to defeat a strong enemy.

Also, as disclosed in a first printing of 'Terekuresuta Kanzen Koryaku Technique Book' (Tokuma Communications Co. Ltd., Nov. 1, 1986: 22-24), a game is known where a player operates a plurality of characters alone. In this prior art shooting game (a kind of action game), obtaining a predetermined item makes it possible to enhance power and make a formation together with parts acquired through a predetermined operation, which allows a player to proceed with the game more advantageously.

Likewise, in a shooting game disclosed in a first printing of 'Gradius Hissho Koryakuho' (Futaba Publishers Ltd., Jun. 22, 1986: 11), a player may have his own machine followed by a double thereof referred to as an option. This option is capable of shooting the same weapon as the player's own machine's. Thus, the more the number of options increases, the more advantageously the player can proceed with the game.

However, the above network action RPG does not allow a player to play the game alone in situations requiring cooperation among a plurality of players. Even if it were possible to play the game alone, the player would need to take more complicated measures and would have more difficulties as compared to the case where a plurality of players cooperate to play the game; thus, the player might lose interest in the game.

Also, none of the above-described shooting games are designed for a plurality of players to play cooperatively. Moreover, even in a case where one player plays the game alone, it is only possible for him to develop the progress of the game advantageously by adding his own machine's doubles and parts for the purpose of supporting player characters. That is, these games are not supposed to be played by changing formations in a strategic way, although they allow the player to defeat the enemy more easily by increasing the number of options following the player's own machine and by providing parts for making a formation. Therefore, the player may become frustrated with the monotonous progress of the game.

It is therefore a feature of an exemplary illustrative embodiment to provide a novel game apparatus and storage medium storing a game program.

It is another feature of an exemplary illustrative embodiment to provide a game apparatus and a storage medium storing a game program for playing an action game with a novel operating environment incorporated therewith.

It is still another feature of an exemplary illustrative embodiment to provide a game apparatus and a storage medium storing a game program that, regardless of a number of players, offer a player an environment of a similar level as when a plurality of players play the action game in cooperation, and do not change the action game's interesting aspects even if the number of players varies.

It is yet another feature of an exemplary illustrative embodiment to provide a game apparatus and a storage medium storing a game program that enhance fascinating factors in the action game relating to strategic aspects thereof.

A game apparatus according to an exemplary illustrative embodiment comprises at least one operating means, a game processing means and a display means, and is for playing a game by directly operating a predetermined number of player characters in real time. This game apparatus comprises a number-of-operating-players setting means, a player characters control means, an operating player setting means, and a comparing means. The number-of-operating-players setting means sets a number of operating players. The player characters control means controls the predetermined number of player characters based on an operation input from the operating means and on the game processing means, and displays them on the display means. The operating player setting means sets the operating players to each of the predetermined number of player characters. The comparing means compares the number of players set by the number-of-operating-players setting means with the number of the predetermined number of player characters. When the predetermined number of player characters is larger than the number of the players, the operating player setting means lchanges the setting in such a manner that the players may operate more than one player character so that every player character is assigned to one of the players.

More specifically, a game apparatus (10) according to an exemplary illustrative embodiment comprises at least one operating means (22), a game processing means (36), and a display means (34). A number-of-operating-players setting means (36) sets the number of operating players. A player character control means (36) controls a predetermined number of player characters (114a to 114d) based on an operation input from the operating means (22) and on the game processing means (36), and displays the player characters on a display means (34). That is, a game image is displayed. An operating player setting means (36, S1, S13) sets the operating players to each of the predetermined number of player characters. The comparing means (36, S31, S35, S39) compares the number of players set by the number-of-operating-players setting means (36) with the number of the predetermined number of player characters. When the predetermined number of player characters is larger than the number of players, the operating player setting means (36, S1, S13) changes the setting in such a manner that the players may operate more than one player character so that every player character (114a to 114d) is assigned to one of the players.

According to an exemplary illustrative embodiment, regardless of the number of players, every player character is assigned to the players, and thus it is possible to offer a player environment of a similar level as in a case where a plurality of players play the action game cooperatively. Therefore, the game does not vary in its interesting aspects, even if the number of players changes.

In addition, decreasing the number of players would never increase the difficulty of playing the action game.

In a certain aspect, an exemplary illustrative embodiment further comprises a formation selecting means for selecting a formation of a plurality of player characters. The formation selecting means is activated only for the player characters operated by the player assigned a plurality of player characters, in accordance with a result of a setting made by the operating player setting means. The player character control means controls the plurality of player characters with the formation selecting means activated, based on the operation input from the operating means and on the game processing means so as to make a predetermined formation, and displays them on the display means simultaneously. More specifically, the game apparatus (10) further comprises the formation selecting means (36, S15). The formation selecting means (36, S15) selects a formation of a plurality of player characters. The formation selecting means (36, S15) is activated only for the player characters operated by the player assigned a plurality of player characters (the means is not activated if "YES" is followed in step S5, for example), in accordance with a result of a setting made by the operating player setting means (36, S1, S13). The player character control means (36) controls the plurality of player characters when the formation selecting means (36, S15) is activated, based on the operation input from the operating means (22) and on the game processing means (36) so as to make a predetermined formation, and displays them on the display means (34) simultaneously. In this way, since it is possible to select a desired formation, in a case where more than one person is enjoying the action game, the players may decide the formation of all the player characters through discussions by directly moving characters in real time. Also, in a case where a single player plays the game alone, he may choose a desired formation and play the action game as the plurality of players do. That is, it is possible to enjoy the action game at any time in almost the same player environment, irrespective of the number of players.

In a certain exemplary illustrative embodiment, the formation selecting means selects one of the formations according to a predetermined operation input from the operating means. More specifically, the formation selecting means (36, S15) selects one of the formations according to the predetermined operation input from the operating means (22), for example, a button operation. Therefore, since a desired formation can be selected by a simple operation, it is possible to change formations even during a battle in order to move forward with the game advantageously. Thus, this preserves active properties of the game.

In another exemplary illustrative embodiment, the formation selecting means displays a list of formations to be selected on the display means in accordance with a first operation input from the operating means, and selects one of the formations to be selected from the displayed list in accordance with a second operation input. More specifically, the formation selecting means (36, S11) displays a list (150, 152) of formations to be selected on the display means (34) in accordance with the first operation input from the operating means (22), and selects one of the formations to be selected from the displayed list (150, 152) in accordance with the second operation input. In this way, the operation is easy because formations can be changed just by selecting a desired formation from the list. Also, various formations are strategically conceivable according to the progress of the game, which makes the game more elaborate.

In still another exemplary illustrative embodiment, the operating player setting means includes a re-assignment means that, after one of the players has been designated to operate a number of player characters, re-assigns the player characters under a predetermined condition in such a manner that another player operates a different number of player characters. More specifically, after one of the players has been designated by the operating player setting means (36, S1, S13) to operate a number of player characters, the re-assignment means (36, S13) re-assigns the player characters under the predetermined condition in such a manner that another player operates a different number of player characters. For example, each of the players may plunder a player character from another player or hand over a player character to another player for a strategic purpose. In this way, the player characters set (assigned) at the start of the game can be changed during the game, which makes the game more enjoyable, avoiding monotony.

A storage medium storing a game program according to another exemplary illustrative embodiment stores a game program for a game apparatus comprising at least one operating means and a display means for playing a game by operating a predetermined number of player characters. This game program causes a processor of the game apparatus to execute a number-of-operating-players setting step, a player character control step, an operating player setting step, and a comparing step. The number-of-operating-players setting step sets a number of operating players. The player character control step controls a predetermined number of player characters based on an operation input from the operating means, and displays them on the display means. The operating player setting step sets an operating player to each of the predetermined number of player characters. The comparing step compares the number of players set by the number-of-operating-players setting step with a number of the predetermined number of player characters. When the predetermined number of player characters is larger than the number of the players, the operating player setting means changes a setting in such a manner that the players may operate more than one player character so that every player character is assigned to one of the players.

In other exemplary illustrative embodiments, even if a single player plays the game alone, it is possible to offer a player environment of a similar level as in the case where a plurality of players play the game cooperatively.

BRIEF DESCRIPTION OF THE DRAWINGS

These and other features and advantages will be better and more completely understood by reference to the following detailed description of exemplary illustrative embodiments in conjunction with the drawings of which:

FIG. 4 is an illustrative view showing one example of player data and character data shown in FIG. 3;

DETAILED DESCRIPTION

Figure 1:
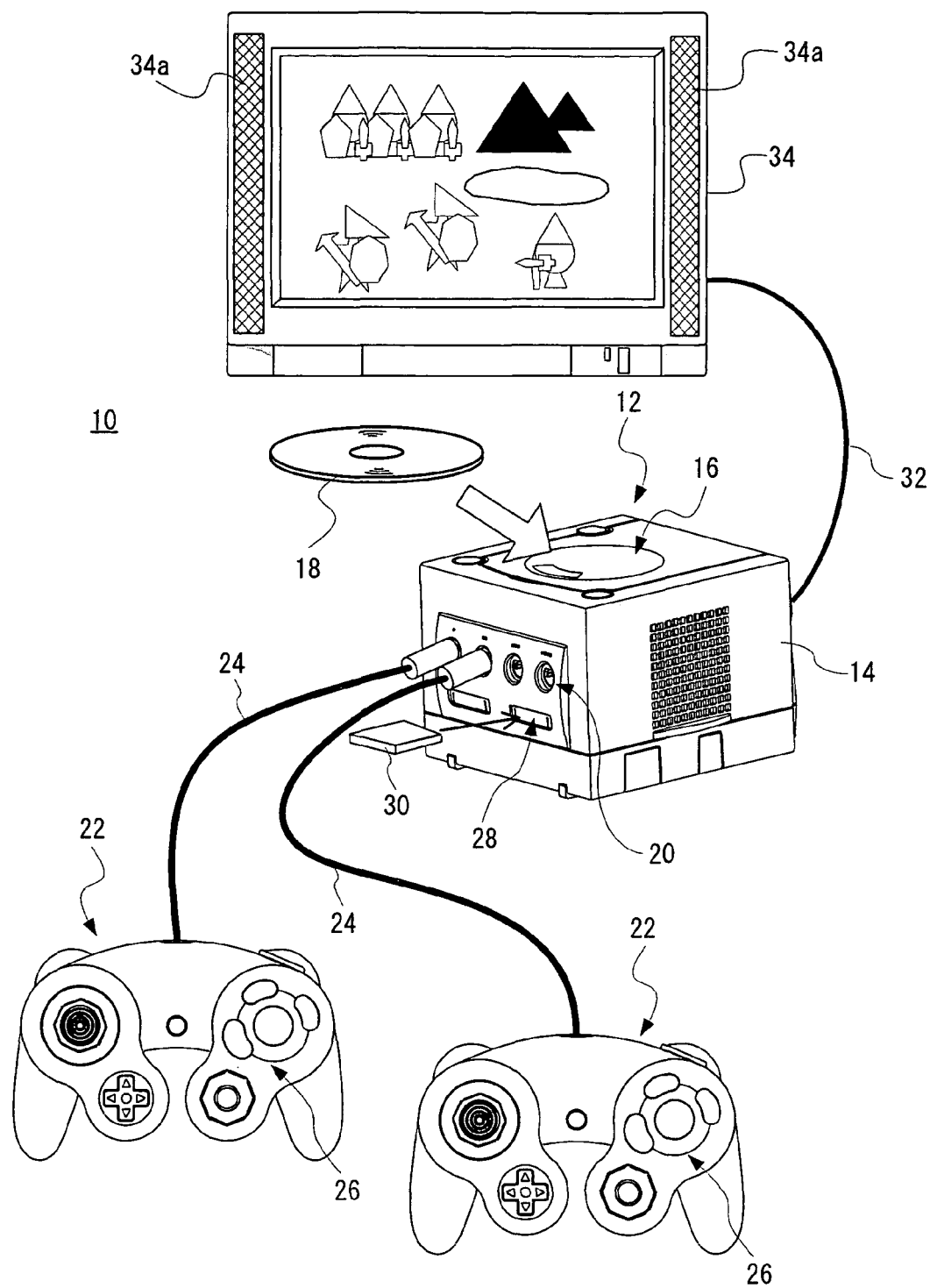
FIG. 1 is an illustrative view showing a game apparatus of an exemplary illustrative embodiment.

Referring to FIG. 1, a game apparatus 10 of an exemplary illustrative embodiment includes a video game machine 12. The video game machine 12 includes an approximately cubic housing 14, and comprises an optical disk drive 16 on an upper end of the housing 14. The optical disk drive 16 has an optical disk 18 attached as an example of an information storage medium storing a game program and the like. A front side of the housing 14 comprises a plurality of (four in this exemplary illustrative embodiment) connectors 20. These connectors 20 are intended to connect a controller 22 by a cable 24 to the video game machine 12. In this exemplary illustrative embodiment, it is possible to connect a maximum of four controllers 22 to the video game machine 12.

It is noted that FIG. 1 shows a state in which two controllers 22 are connected to the video game machine 12. However, connections are possible to a maximum of four controllers 22 in this exemplary illustrative embodiment, and thus four persons can play the game at a time in this exemplary illustrative embodiment.

The controller 22 comprises an operating portion (operating switch) 26 on a top, bottom or side thereof. The operating portion 26 includes two analog joysticks, one cross switch, and a plurality of button switches, for example. One analog joystick is used for inputting a moving direction and/or moving speed or moving amount of a player character (e.g., moving image character operable by a player with the controller 22), by a slanting amount and direction of the stick. The other analog joystick controls by a slanting direction a movement of a virtual camera. The cross switch is used for specifying the moving direction of a player character in place of the analog joystick. The button switch is used for specifying the movement of the player character, changing a viewpoint of the virtual camera of three-dimensional image, and adjusting the moving speed of the player character, and so forth. Furthermore, the button switch controls a menu selection and a pointer or a cursor movement, for example.

It is noted that, in this exemplary illustrative embodiment, the controller 22 is connected by the cable 24 integrated therewith to the video game machine 12. However, the controller 22 may be connected to the video game machine 12 in another way, for example, in a wireless manner via electromagnetic waves (radio wave or infrared ray). Additionally, a concrete configuration of the operating portion 26 of the controller 22 is not limited to the configuration presented in this exemplary illustrative embodiment and may be arbitrarily changed, as a matter of course. For example, only one analog joystick may be used or neither of the two joysticks may be used. The cross switch need not be necessarily employed.

One or a plurality of (two in this exemplary illustrative embodiment) memory slots 28 are provided on a front surface of the housing 14 of the video game machine 12 and below the connectors 20. A memory card 30 is inserted into the memory slot 28. The memory card 30 is utilized to load and store temporarily a game program read from the optical disk 18 and to save game data (result of the game, for example) concerning the game played on this game apparatus 10.

An AV cable connector (not illustrated) is provided on a rear surface of the housing 14 of the video game machine 12. The connector is used to connect a monitor 34 to the video game machine 12 through the AV cable 32.

To play the game (or another application) on this game apparatus 10, a user or a game player firstly turns on the video game machine 12, and then selects the appropriate optical disk 18 storing the video game (or another application he wishes to play) and loads the optical disk 18 into a disk drive 16 of the video game machine 12. Accordingly, this causes the video game machine 12 to start executing the video game or another application based on the software stored in the optical disk 18. The user operates the controller 22 in order to provide input to the video game machine 12. For example, the user starts the game or another application by operating any part of the operating portion 26. Also, operating another part of the operating portion 26 makes it possible to move a moving image character (player character) in a different direction or change the user's viewpoint (e.g., a camera position) in a three-dimensional (3D) game world.

Figure 2:
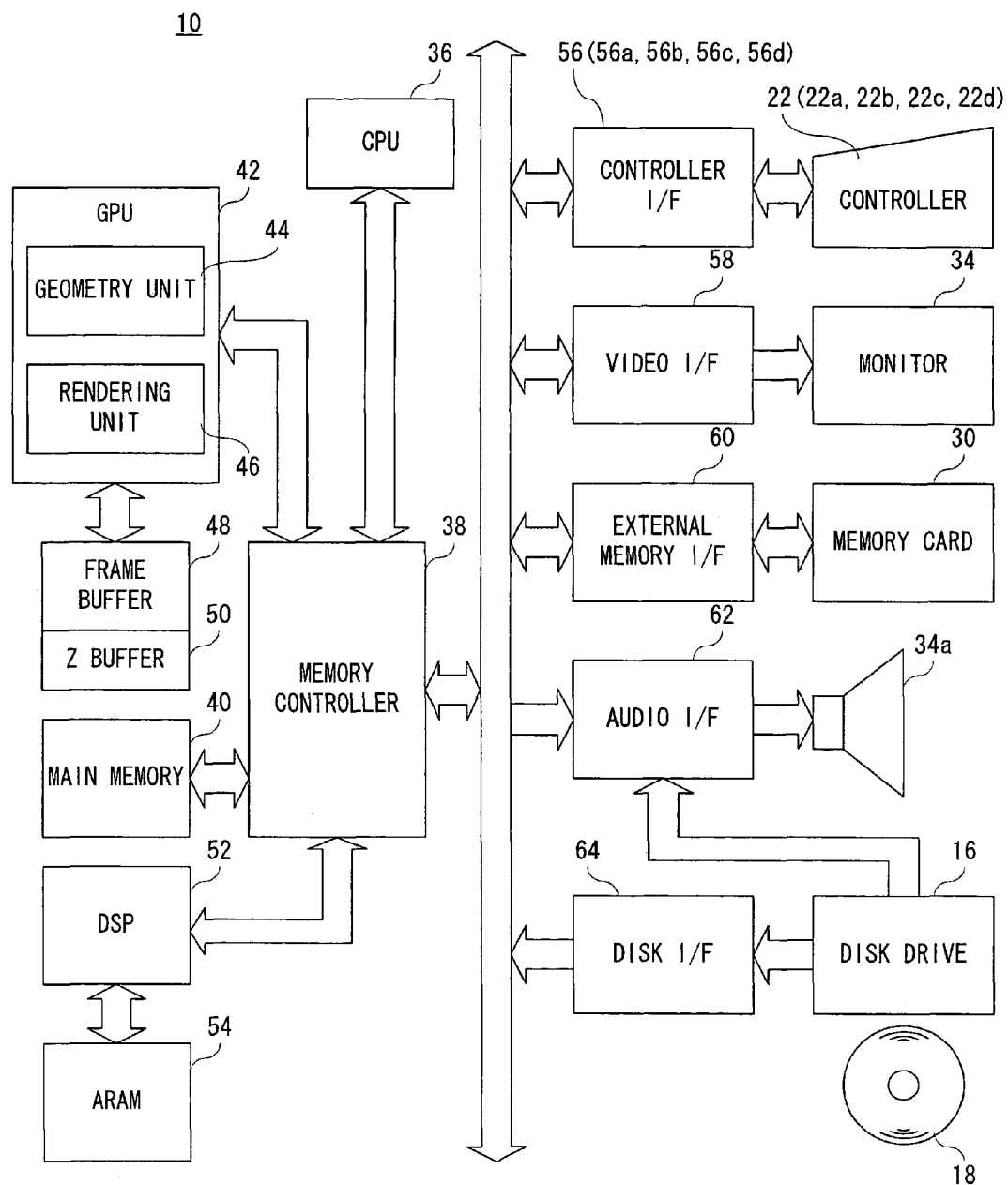
FIG. 2 is a block diagram showing an electrical configuration of the game apparatus shown in FIG. 1.

FIG. 2 is a block diagram showing an electrical configuration of the game apparatus 10 of the FIG. 1 embodiment. The game apparatus 10 (the video game machine 12) comprises a central processing unit (hereinafter referred to as "CPU") 36. This CPU 36 is also called a computer or processor, etc., and it is responsible for entirely controlling the video game machine 12. The CPU 36 or computer functions as a game processor, and is joined via a bus with a memory controller 38. The memory controller 38 mainly controls writing and reading of data to/from a main memory 40 joined via the bus under the control of the CPU 36. To this memory controller 38, a GPU (graphics processing unit) 42 is joined.

The GPU 42 forms one part of a rendering means, and is comprised of a single chip (an ASIC, for example). The GPU 42 receives a graphics command from the CPU 36 via the memory controller 38, and generates a three-dimensional (3D) game image by a geometry unit 44 and a rendering unit 46 according to the command. More specifically, the geometry unit 44 performs coordinate operation processes such as rotation, movement and transformation, etc. of various characters and objects in the three-dimensional coordinate system (constructed of a plurality of polygons, the polygons comprising a polygonal plan surface defined by at least three vertex coordinates). The rendering unit 46 performs an image generating process such as attaching a texture (e.g., texture image) to each polygon of various objects, and so forth. Therefore, the GPU 42 generates 3D image data to be displayed on the game screen and stores it into a frame buffer 48.

It is noted that the data (e.g., primitives or polygons and textures, etc.) necessary for the GPU 42 to execute the graphics command is obtained by the GPU 42 from the main memory 40 via the memory controller 38.

The frame buffer 48 is a memory for rendering (accumulating) one frame of image data from a raster scan monitor 34, for example, and is rewritten by the GPU 42 by one frame. A video I/F 58 to be described later reads the data of the frame buffer 48 via the memory controller 38, and as a result of this, the 3D game image is displayed on the screen of the monitor 34.

Additionally, a Z buffer 50 has a memory capacity equivalent to the number of pixels corresponding to the frame buffer 48 multiplied by the number of bits of depth data per pixel, and stores depth information or depth data (e.g., a Z value) on dots corresponding to each storage position in the frame buffer 48.

It is noted that both the frame buffer 48 and the Z buffer 50 may be constructed using one portion of the main memory 40.

The memory controller 38 is also joined to an ARAM 54 via a DSP (digital signal processor) 52. Thus, the memory controller 38 controls writing to and/or reading from the ARAM 54 as a sub memory, as well as writing to and/or reading from the main memory 40.

The DSP 52 functions as a sound processor and generates audio data corresponding to sounds, voices or music required for the game by using sound data stored in the main memory 40 (see FIG. 3) or using sound waveform data (not illustrated) written into the ARAM 54.

The memory controller 38 is further joined by a bus to each of the interfaces (I/F) 56, 58, 60, 62 and 64. The controller I/F 56 is an interface for the controller 22 and applies to the CPU 36 an operating signal or data from the operating portion 26 of the controller 22, through the memory controller 38. As has been explained by use of FIG. 1, in this exemplary illustrative embodiment, it is possible to connect a maximum of four controllers 22 (hereinafter referred to as the controllers 22a, 22b, 22c, and 22d for the sake of convenience in giving an explanation), and thus four controller I/Fs 56a, 56b, 56c, and 56d are actually provided corresponding to the controllers 22a, 22b, 22c, and 22d, respectively.

The video I/F 58 accesses the frame buffer 48 to read image data that has been generated in the GPU 42, and applies to the monitor 34 the image signal or the image data (e.g., digital RGB pixel value) via the AV cable 32 (FIG. 1).

The external memory I/F 60 joins the memory card 30 (FIG. 1) inserted in the front surface of the video game machine 12 to the memory controller 38. This enables the CPU 36 to write the data into this memory card 30 or read out data from the memory card 30 via the memory controller 38. The audio I/F 62 applies to the speaker 34a of the monitor 34 with audio data supplied by the DSP 52 through the memory controller 38 or an audio signal (sound signal) read from the optical disk 18.

Furthermore, the disk I/F 64 joins the disk drive 16 to the memory controller 38, which causes the CPU 36 to control the disk drive 16. This disk drive 16 writes program data and texture data, etc. read out from the optical disk 18, into the main memory 40 under the control of the CPU 36.

Figure 3:
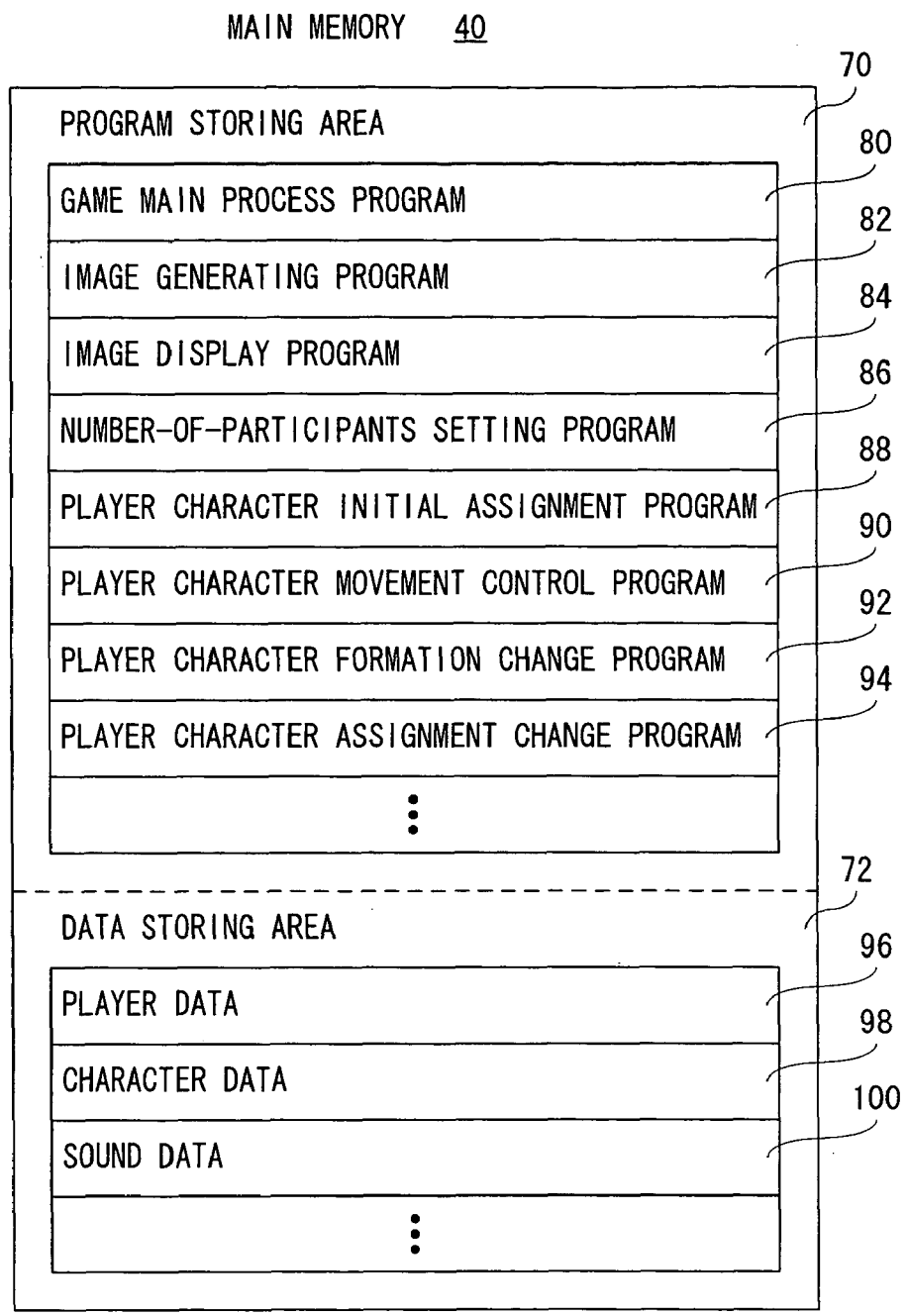
FIG. 3 is an illustrative view showing one example of a memory map of a main memory shown in FIG. 2.

FIG. 3 is a memory map of the main memory 40. The main memory 40 includes a program storing area 70 and a data storing area 72. The program storing area 70 stores such game programs as a game main processing program 80, an image generating program 82, an image display program 84, a number-of-participants setting program 86, a player character initial assignment program 88, a player character movement control program 90, a player character formation change program 92 and a player character assignment change program 94.

The game main processing program 80 is a program for processing a main routine for a game (an action role-playing game in this exemplary illustrative embodiment) executed by the video game machine 12. The image generating program 82 is a program for generating, with the use of image data described later, 3D game images such as field (e.g., background) images for the game, moving image characters including player characters and their enemy (opponent) characters in the game, and characters (e.g., item characters) of items (e.g., swords, shields, gold coins, medicine, etc.) used or held by such moving image characters. The image display program 84 is a program for displaying a 3D game image generated by the image generating program 82, as a 2D game screen, on the monitor 34.

The number-of-participants setting program 86 is a program for setting the number of players, i.e., the number of participants, which has been selected on a menu screen (see FIG. 5) before the start of the game. The player character initial assignment program 88 is a program for assigning a player character to each of players, according to the number of players set by the number-of-participants setting program 86 and the number of the predetermined number of player characters (four persons in this exemplary illustrative embodiment) in the action role-playing game (hereinafter referred to as an "action RPG"). The player character movement control program 90 is a program for controlling the movements of a player character, based on instructions from a player (e.g., input from the controller 22) and on the number of participants set by the number-of-participants setting program 86 or a formation that has been changed according to the player character formation change program 92 described later.

It is noted that detailed explanations concerning the method of initially assigning player characters and the control of movements of a player character will be provided below.

The player character formation change program 92 is a program for displaying a menu screen for formation change (see FIG. 10) in response to an instruction from a player (e.g., input from the controller 22) and changes or resets the layout of player characters according to the formation selected by a player. A player character assignment changing program 94 is a program for adding a player character (e.g., corresponding to the sword in this exemplary illustrative embodiment) to the array of the relevant certain player character, or it re-assigns the player character to the certain player character when a certain player character has obtained a specific item (a sword here). Detailed explanations concerning the array change will be thoroughly described below.

Although not illustrated, the program storing area 70 stores a program for controlling the movements of moving image characters other than player characters. It also stores a sound control program, which outputs sounds required for the game, such as game music (BGM), sound effects, game characters' voices and imitative sounds, using sound data 100 stored in the data storage area 72 and sound waveform data (not illustrated) stored in the ARAM 54.

In addition, the data storing area 72 stores such game data as player data 96, character data 98 and sound data 100. The player data 96 is data relating to a player playing the relevant action RPG. More specifically, as shown in FIG. 4 (A), the player data 96 is provided corresponding to each of the players (first player, second player, third player, . . . ), and each player data includes data on the number of assigned characters, data on assigned character specification, and data on player operation. In the example shown in FIG. 4 (A), first player data 960 includes number-of-assigned-characters data 960a, assigned character specification data 960b, and first player operation data 960c.

The number-of-assigned-characters data 960a is data relating to the number of player characters assigned to the first player. In this exemplary illustrative embodiment, up to four player characters may exist and the number thereof is selectable from "1" to "4". Therefore, the number-of-assigned-characters data 960a is composed of a 2-bit register, for example, and includes a data value of "00" if the number of assigned player characters is "1", a data value of "01" if the number of assigned player characters is "2", a data value of "10" if the number of assigned player characters is "3", and a data value of "11" if the number of assigned player characters is "4".

The assigned character specification data 960b is data for distinguishing a player character assigned to (selected for) the first player from the others. As is described above, since four player characters exist in this exemplary illustrative embodiment, the assigned character specification data 960b is composed of a 4-bit register, for example, and each bit corresponds to each player character. The register sets a data value of "1" to a bit corresponding to a player character assigned to the first player, and sets a data value of "0" to a bit corresponding to a player character not assigned to the first player.

The first player operation data 960c is data concerning the operation of the first player. The operation data 960c to be stored is read from the control I/F 56 (56a, 56b, 56c or 56d) to which the controller 22 (22a, 22b, 22c or 22d) operated by the first player is connected.

Regarding the second player data 962 and the third player data 964 and the like, detailed explanations are omitted because these data are similar to the first player data 960 described above.

The character data 98 is data relating to a player character in the game. More specifically, as shown in FIG. 4 (B), the character data 98 is provided to each of the player characters (first player character, second player character, third player character, etc.), and each character data includes image data and position data. In the example shown in FIG. 4 (B), the first player character data 980 includes image data 980a and position data 980b. The image data 980a is data on an image actually displayed, such as polygon data and texture data concerning the first player character (corresponding to a player character 114a described later). The position data 980b is data concerning a 3D position (e.g., coordinates) of the current first player character in the game world. At the start of the game, the default position data 980b is provided, and after that, the data is updated in accordance with the operation of the player.

It is noted that, although not illustrated, in the game world of this exemplary illustrative embodiment, an X-coordinate value and Z-coordinate value indicate the position of a player character on a 2D plane, and a Y-coordinate value indicates a position of the player character in a 3D direction (e.g., perpendicular to the 2D plane).

In addition, regarding the second player character data 982 and the third player character data 984 and the like, detailed explanations are omitted because these data are similar to the first player character data 980 described above.

It is noted that, such game programs and game data or the like are read out together or partially and sequentially from a ROM 18 shown in FIG. 1, and are stored (loaded) in the main memory 40. Some of the data is updated as the game proceeds. In addition, although not illustrated, the data storing area 72 stores other game data required for the progress of the game (such as data on characters other than player characters, etc.), game data generated with the progress of the game (such as game results, etc.) and flag data.

Figure 5:
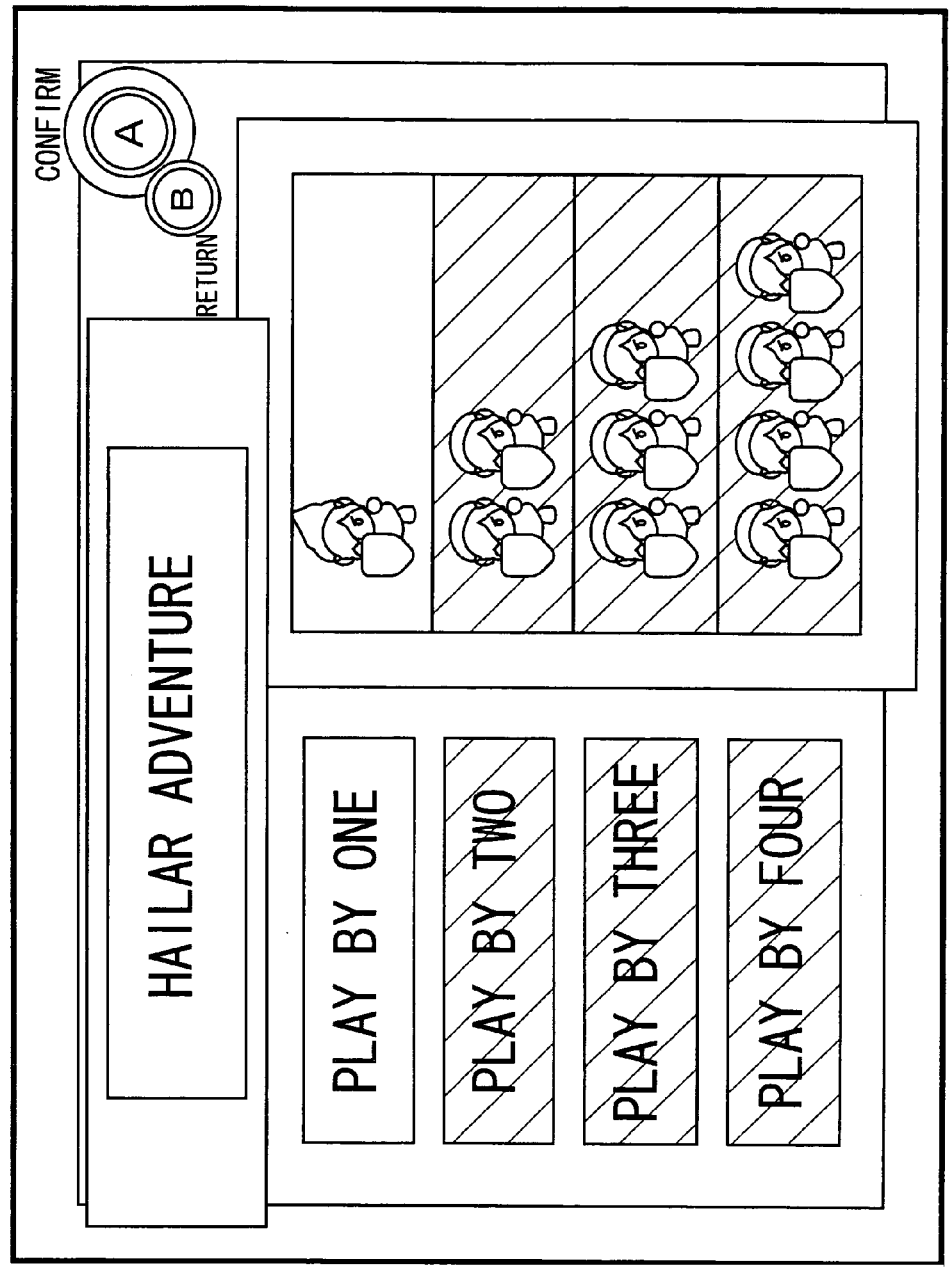
FIG. 5 is an illustrative view showing one example of a play mode selection screen displayed on a monitor shown in FIG. 1.

In the action RPG of this exemplary illustrative embodiment, a menu screen for selecting a game play mode (hereinafter referred to as "play mode selection screen") 110 appears on the monitor 34 as shown in FIG. 5, in advance of the start of the game. In this play mode selection screen 110, the number of players to play the action RPG is selected. In the relevant action RPG, for example, one to four persons can play the game at a time.

An example shown in FIG. 5 describes a state where a one-person play mode (hereinafter referred to as "1P mode") is selected. More specifically, the example shows a state where a player has moved a cursor, selected "Play by one", and then pressed "Confirm" (A button) by operating a joystick like a cross switch on the controller 22. In addition, display areas of not selected two-person play mode ("Play by two"), three-person play mode ("Play by three") and four-person play mode ("Play by four"), are shaded with oblique lines. This means that these areas are different in brightness and color from display area of the selected 1P mode (or they are displayed in reverse video).

In the action RPG of this exemplary illustrative embodiment, even if any of the play modes is selected, the number of player characters operable during the game is four. Therefore, when the 1P mode has been selected, one player needs to operate by himself all the four player characters in the action RPG. In the two-person play mode (2P mode), the player characters are equally distributed to the players at the start of the game, and each player operates two player characters. In the 2P mode, however, either of the players may operate up to three player characters, and it is thus possible to plunder a character player operated by the other player during the game. In the three-person play mode (3P mode), the player characters are equally distributed to the players at the start of the game, and each player operates one player character. In the 3P mode, however, the players scramble for the remaining one player character during the game. In the four-person play mode (4P mode), the player characters are equally distributed to the players at the start of the game, and each player operates one player character. In the 4P mode, however, it is not possible to pillage a player character from the other players, unlike in the cases of the 2P mode and the 3P mode.

Figure 6:
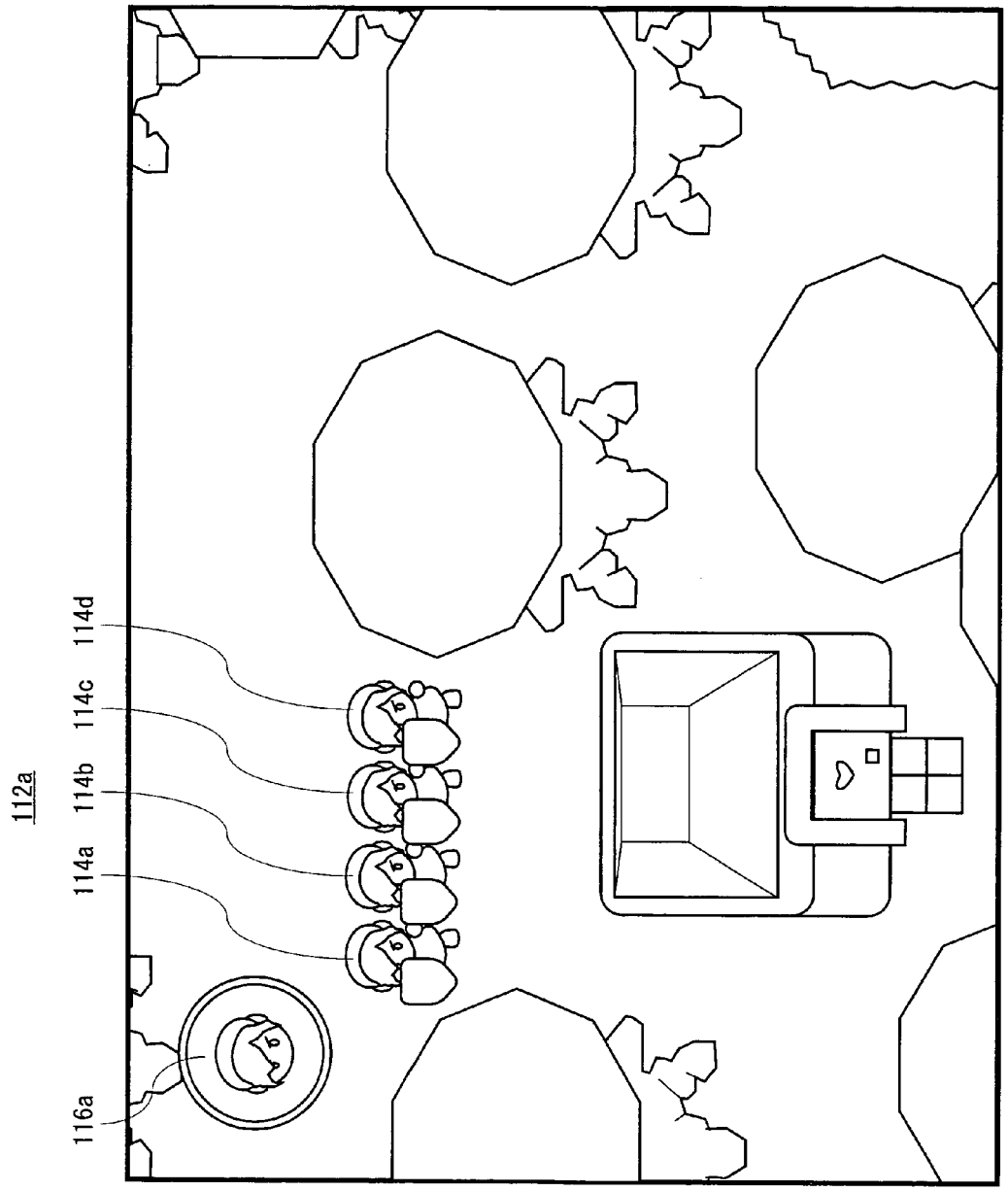
FIG. 6 is an illustrative view showing one example of a 1P screen at the start of a game in a 1P mode.

When the 1P mode is selected, for example, a game screen (hereinafter referred to as "1P screen" for the sake of convenience in providing an explanation) 112a as shown in FIG. 6 appears on the monitor 34. This 1P screen 112a displays player characters 114a, 114b, 114c and 114d in a single horizontal formation (wide formation) at the upper left area as viewed from the middle of the 1P screen 112a. That is, in the 1P mode, one player (e.g., the first player) is assigned the four player characters 114a to 114d. At this time, the number-of-assigned-characters data 960a contained in the above-mentioned first player data 960 is set to "11", and the assigned character specification data 960b is set to "1111". The upper left area of the 1P screen 112a displays an identification sign 116a indicating the 1P mode. This identification sign 116a is displayed corresponding to the first player (1P). In the vicinity of the identification sign 116a, although not illustrated, displayed are images showing the lives (vital forces), acquired items, etc. of the player characters 114a to 114d. Also, the background of the game world is displayed at the start of the game.

It is noted that game screens described below are the same as above in the fact that the background of the game world is displayed, and thus an explanation to that effect is omitted hereinafter.

Figure 7:
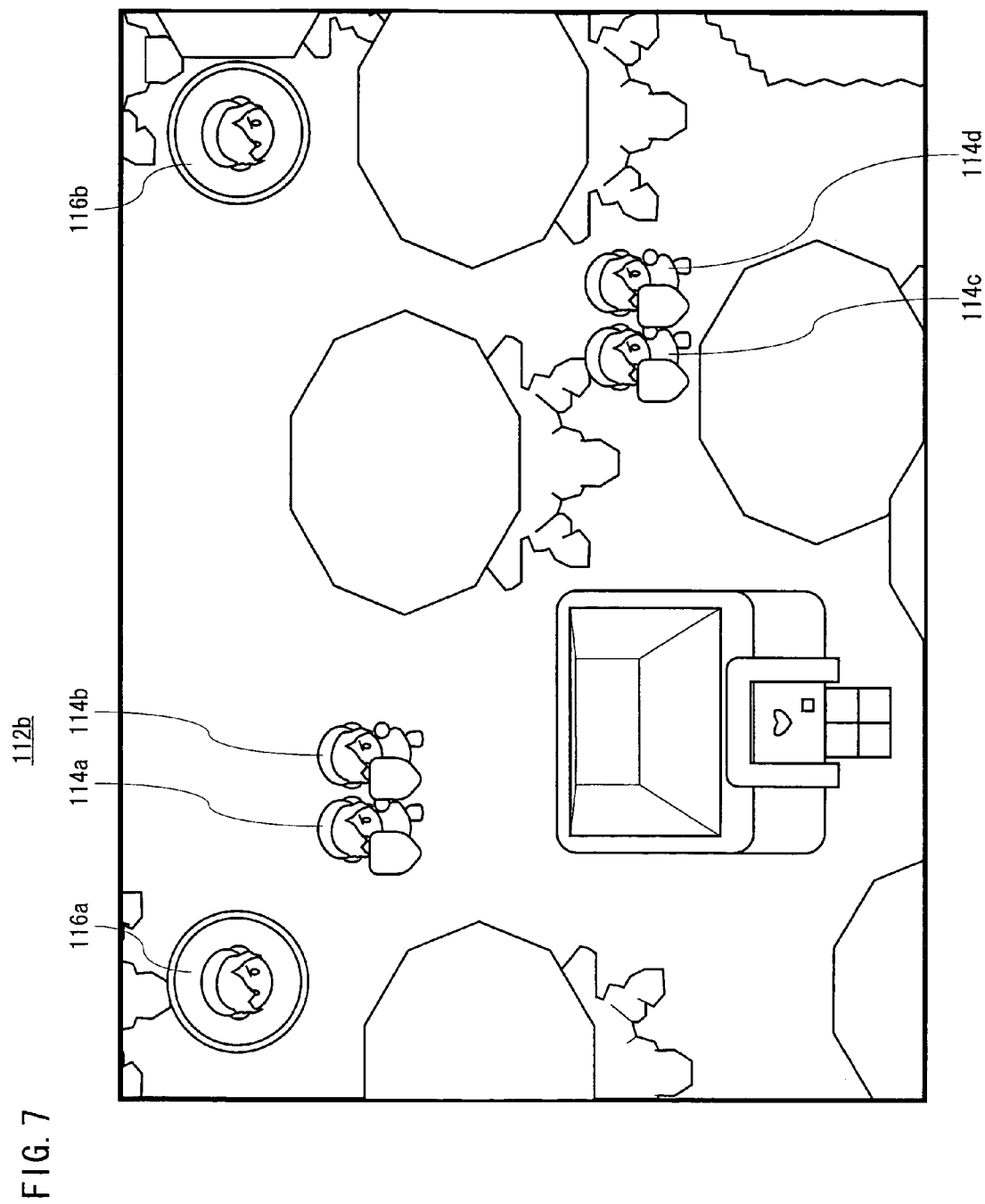
FIG. 7 is an illustrative view showing one example of a 2P screen at the start of the game in a 2P mode.

In addition, when the 2P mode is selected in the play mode selection screen 110 shown in FIG. 5, the player characters 114a to 114d are equally distributed to two players. Thus, when the 2P mode is selected, a game screen (hereinafter referred to as "2P screen" for the sake of convenience in giving an explanation) 112b as shown in FIG. 7, for example, appears on the monitor 34 at the start of the game. More specifically, this 2P screen 112b displays the player characters 114a and 114b operated by the 1P in a formation of single horizontal row on the upper left area as viewed from the middle of the 2P screen 112b. Also, the player characters 114c and 114d operated by the second player (hereinafter referred to as "2P") are displayed in a formation of single horizontal row on the lower right area as viewed from the middle of the relevant 2P screen 112b. Consequently, since the four player characters 114a to 114d are equally distributed to the two players in the 2P mode at the start of the game, the number-of-assigned-characters data 960a in the first player character data 960 is set to "01", and the assigned character specification data 960b in the first player character data 960 is set to "1100", for example. On the other hand, the number-of-assigned-characters data in the second player character data 962 is set to "01", and the assigned character specification data 960b in the second player character data 962 is set to "0011", for example.

It is noted that, in the assigned character specification data of this embodiment, although details are omitted in the explanation using FIG. 4 (A), a most significant bit (MSB) corresponds to the player character 114a, a next bit to the player character 114b, a further next bit to the player character 114c, and a least significant bit (LSB) to the player character 114d. This is also applied to the descriptions provided later.

In addition, the 2P screen 112b displays the identification signs 116a and 116b for identifying the 2P mode at the upper left and upper right of the 2P screen 112b, respectively. As mentioned above, the identification sign 116a corresponds to the 1P and the identification sign 116b corresponds to the 2P. As noted above, during the game, the images of lives and acquired items of player characters operated by the corresponding players are displayed in the vicinities of the identification sign 116a and identification sign 116b. This is also applied to the descriptions provided later.

Figure 8:
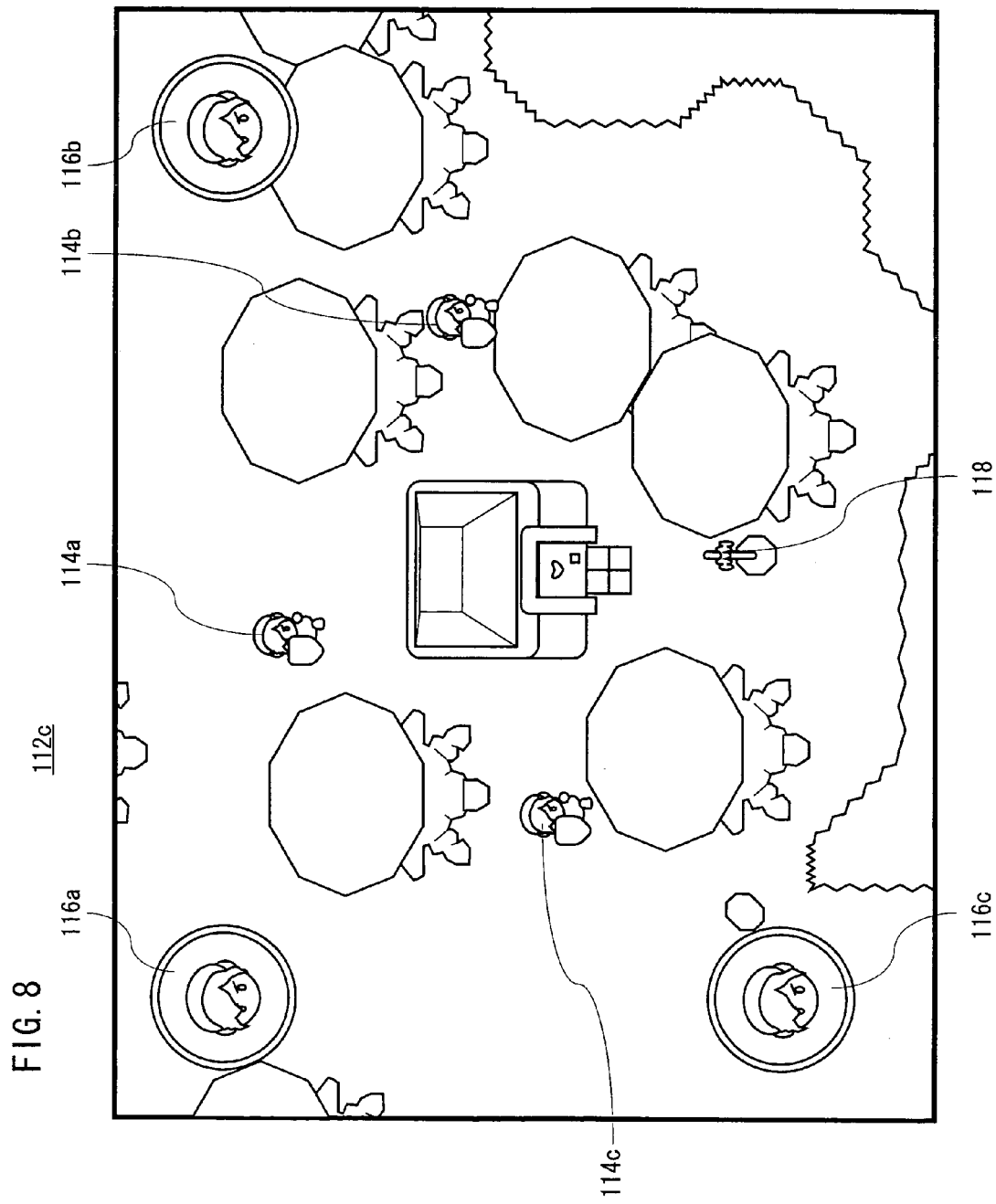
FIG. 8 is an illustrative view showing one example of a 3P screen at the start of the game in a 3P mode.

Moreover, when the 3P mode is selected in the play mode selection screen 110 illustrated in FIG. 5, each of three players is assigned one player character as described above. For example, the 1P is assigned the player character 114a, the 2P is assigned the player character 114b, and the third player (hereinafter referred to as "3P") is assigned the player character 114c. That is, at the start of the 3P mode game, the number-of-assigned-characters data 960a in the first player character data 960 is set to "00", and the assigned character specification data 960b in the first player character data 960 is set to "1000". The number-of-assigned-characters data in the second player character data 962 is set to "00", and the assigned character specification data in the second player character data 962 is set to "0100". Additionally, the number-of-assigned-characters data in the third player character data 964 is set to "00", and the assigned character specification data in the third player character data 964 is set to "0010". Therefore, when the 3P mode is selected, a 3P mode game screen (hereinafter referred to as the "3P screen" for the sake of convenience in giving an explanation) 112c shown in FIG. 8, for example, appears on the monitor 34 at the start of the game.

The 3P screen 112c displays the player character 114a at the upper area as viewed from the approximate middle of the 3P screen 112c, the player character 114b at the right area as viewed from the approximate middle of the 3P screen 112c, and the player character 114c at the left area as viewed from the approximate middle of the 3P screen 112c. Additionally, a sword 118 stuck on the ground is displayed at the lower area as viewed from the approximate middle of the 3P screen 112c. The sword 118 corresponds to the player character 114d (not illustrated), and a player (player character) who has obtained the sword 118 can add the player character 114d to his own array.

Also, the identification signs 116a, 116b and 116c for identifying the 3P mode are displayed at the upper left, upper right and lower left of the 3P screen 112c, respectively. As aforesaid, the identification sign 116a corresponds to the 1P and the identification sign 116b corresponds to the 2P. In addition, the identification sign 116c corresponds to the 3P.

Figure 9:
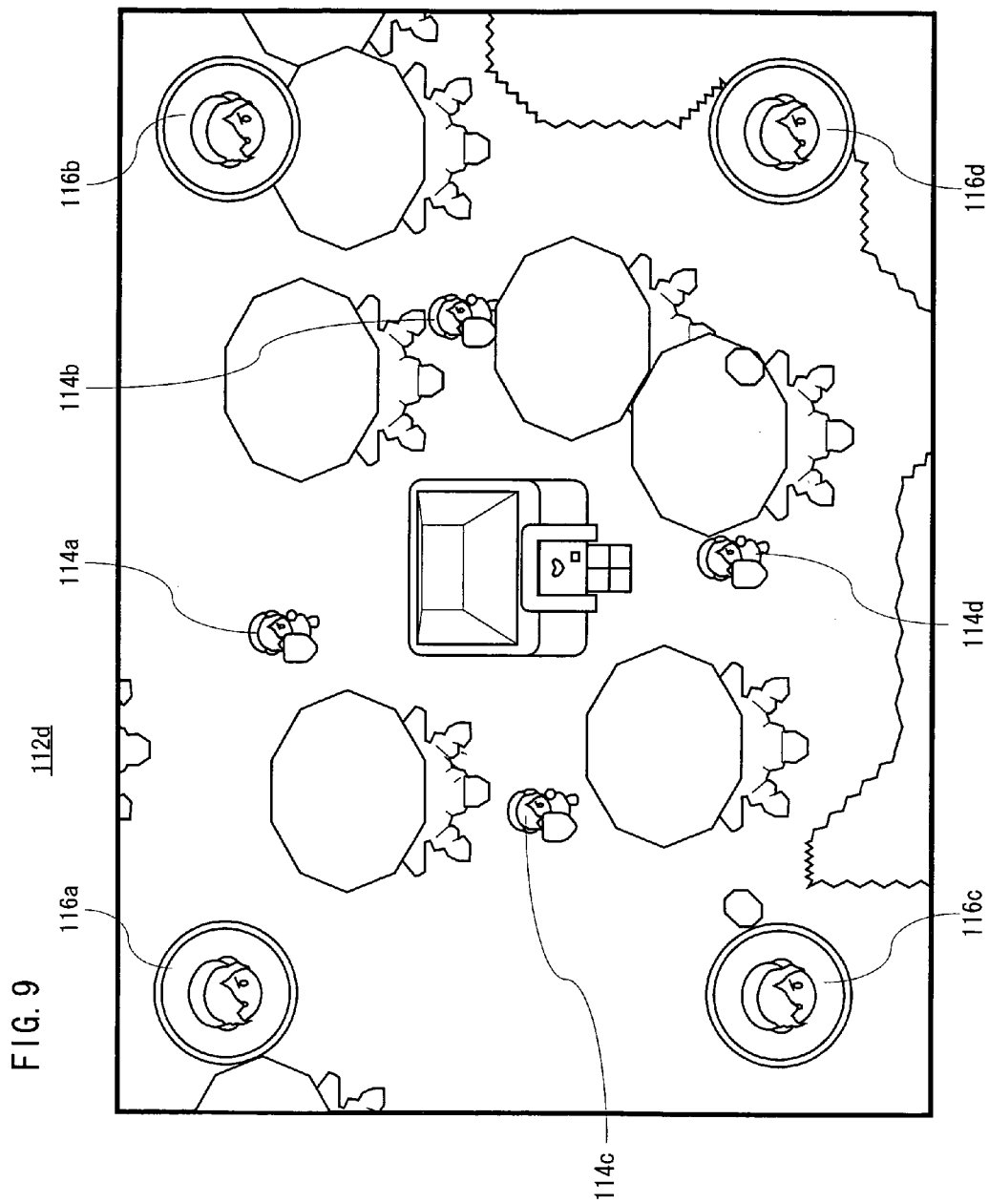
FIG. 9 is an illustrative view showing one example of a 4P screen at the start of the game in a 4P mode.

Furthermore, when the 4P mode is selected in the play mode selection screen 110 illustrated in FIG. 5, each of four players is assigned one player character as stated above. For example, the 1P is assigned the player character 114a, the 2P the player character 114b, the 3P the player character 114c, and the fourth player (hereinafter referred to as "4P") the player character 114d. That is, the number-of-assigned-characters data 960a in the first player character data 960 is set to "00" and the assigned character specification data 960b in the first player character data 960 is set to "1000". The number-of-assigned-characters data in the second player character data 962 is set to "00", and the assigned character specification data in the second player character data 962 is set to "0100". Additionally, the number-of-assigned-characters data in the third player character data 964 is set to "00", and the assigned character specification data in the third player character data 964 is set to "0010". In addition to that, although not omitted in FIG. 4 (A), the number-of-assigned-characters data in the fourth player character data is set to "00", and the assigned character specification data in the fourth player character data is set to "0001". Therefore, when the 4P mode is selected, a 4P mode game screen (hereinafter referred to as "4P screen" for the sake of convenience in providing an explanation) 112d shown in FIG. 9, for example, appears on the monitor 34 at the start of the game.

The 4P screen 112d displays the player characters 114a to 114c as in the case with the above-mentioned 3P screen 112c, and also displays the player character 114d at the lower area as seen from the approximate middle of the 4P screen 112d. In addition, the identification signs 116a, 116b, 116c and 116d for identifying the 4P mode are displayed at the upper left, upper right, lower left and lower right of the 4P screen 112d, respectively. As mentioned above, the identification sign 116a corresponds to the 1P, the identification sign 116b to the 2P, and the identification sign 116c to the 3P. In addition, the identification sign 116d corresponds to the 4P.

In this way, when one of 1P to 4P modes is selected, one of the game screens (112a to 112d) for the start of the game is displayed, and the game proceeds according to the operation of the player(s).

In the 1P mode, as described above, one player controls the movements, etc. of the four player characters 114a to 114d. During the 1P mode game, the four player characters 114a to 114d make a move or fight a battle against enemy characters in the game world, in the formation selected by the player.

Figure 10:
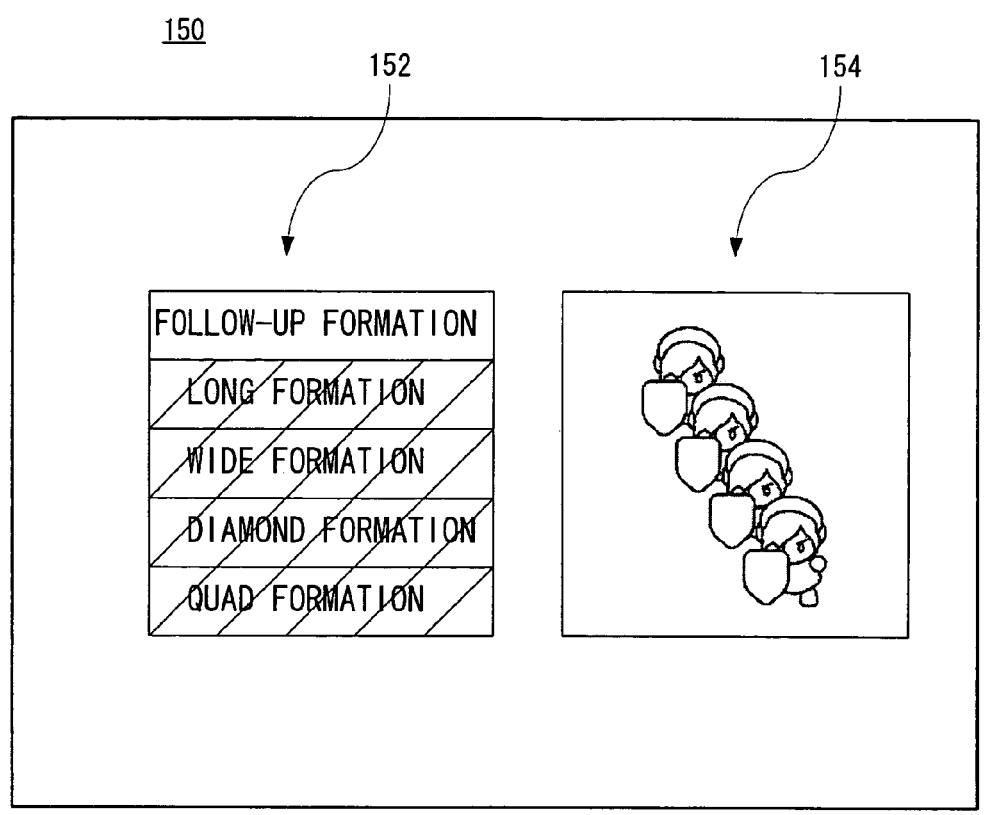
FIG. 10 is an illustrative view showing one example of a formation selection screen.

FIG. 10 presents one example of a screen for selecting a formation (formation selection screen) 150. The formation selection screen 150 is displayed according to the operation of the player. By selecting a desired formation, the player characters 114a to 114d are rearranged to make the selected formation. The formation selection screen 150 is provided with a list 152 and a small window 154. The appearance of a formation selected in the list 152 is displayed in the small window 154. In the example shown in FIG. 10, the "follow-up formation" is selected in the list 152 and the appearance of the formation is displayed in the small window 154.

One portion of the list 152 is diagonally shaded in order to indicate that no formations located in this portion are chosen. In certain exemplary embodiments, the unselected formations are shown with a difference in brightness or color (or in reverse video), etc.

For example, when a player operates a button switch like a start button during the game, the formation selection screen 150 appears on the monitor 34. Next, by operating a joystick like a cross switch, the player moves a cursor (selected position) in the list 152, selects a desired formation, and confirms the selection (presses the A button).

It is noted that FIG. 10 shows a screen for selecting a desired formation, which has been separately switched from the game screen. Alternatively, as a matter of course, a smaller screen than the game screen may overlap the game screen in a multi-window fashion. In displaying a smaller screen over the game screen as stated above, the formation selection screen can be made more convenient and easy-to-operate by displaying it near the character operated by the player who is selecting a formation.

Additionally, although the formation selection screen 150 is here presented so as to select a desired formation, it is also possible to switch among formations in sequence and select a desired one by pressing a predetermined button switch (e.g., B button). This allows the player to change to a desired formation during a battle for the advantageous progress of the game, for example, thereby maintaining the active properties of the game.

Figure 11:
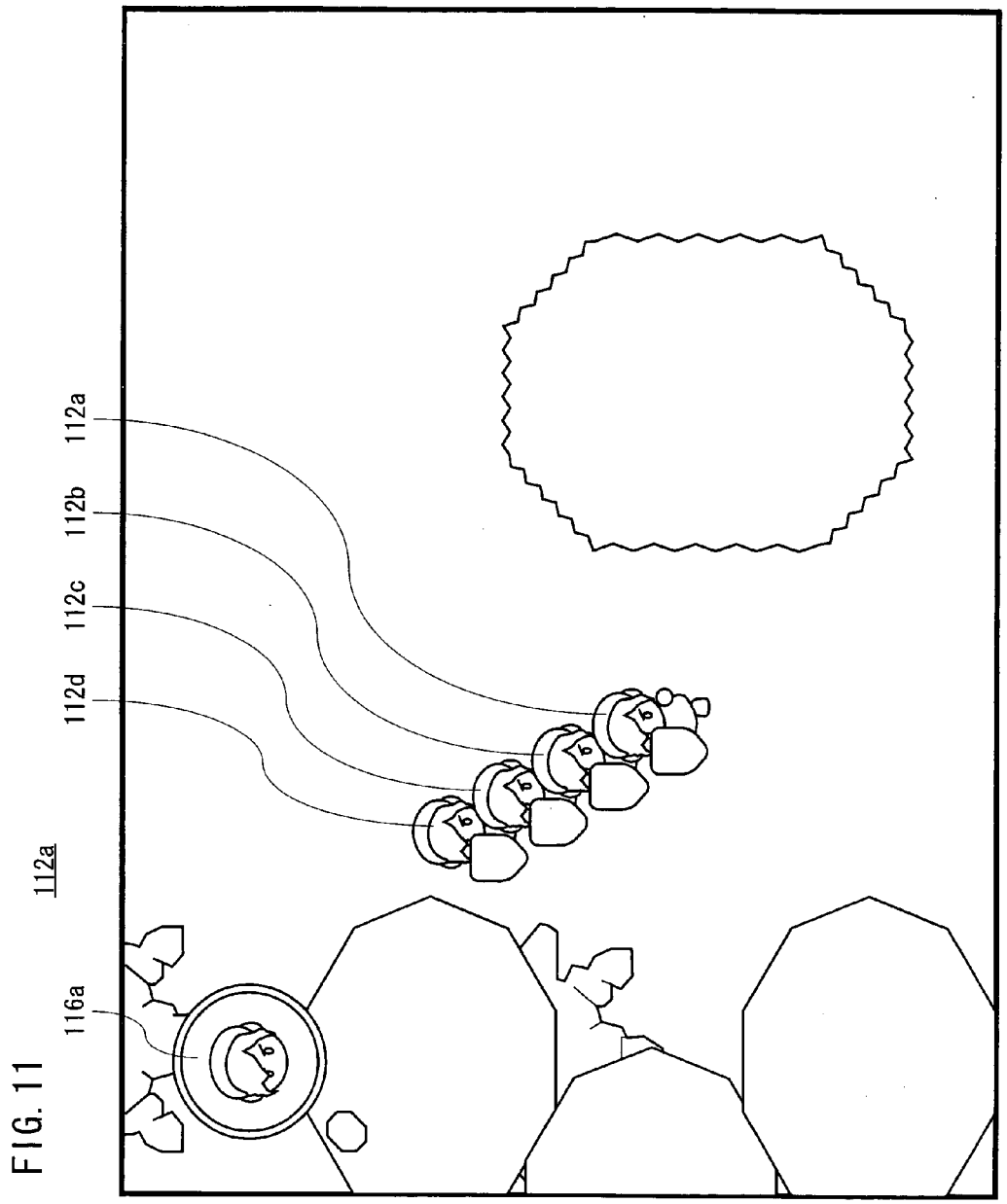
FIG. 11 is an illustrative view showing one example of the 1P screen during the game.

When the player selects the follow-up formation and confirms the selection in the formation selection screen 150, the 1P screen 112a appears on the monitor 34 as shown in FIG. 11. In this follow-up formation, the movements of the player characters 114a to 114d are controlled in such a way as to use by turns the position data on a headmost (first) player character (e.g., the player character 114a). More specifically, the other player characters 114b, 114c and 114d move in a manner that follows a movement route of the player character 114a.

For example, assuming that the game screen is updated in one-frame intervals, the movement of the first player 114a is controlled in accordance with the operation of the player. At this time, the second player character 114b moves into a one frame-preceding position of the player character 114a. Concurrently with that, the third player character 114c moves to a two frames-preceding position of the player character 114a, and the fourth player character 114d to a three frames-preceding position of the player character 114a. The position data here is position data 980a and the like, contained in the character data that has been described above using FIG. 4 (B).

However, since the position data is updated by one frame, the actual control is exercised in such a manner that the player character 114c moves to a one frame-preceding position of the player character 114b and that the player character 114d moves to a one frame-preceding position of the player character 114c.

Such movements of the player characters 114a to 114d are processed by the CPU 36 according to a player character movement control program 90. If the follow-up formation is selected, the player character movement control program 90, under instructions from CPU 36, updates the position data on the player characters 114a to 114d utilizing the position data on the player character 114a by turns as mentioned above, and shifts the player characters 114a to 114d into the positions shown by the updated position data. Additionally, in the cases where another formation is selected as well, the position data on the player characters 114a to 114d are updated in accordance with the player character movement control program 90, and the player characters 114a to 114d move to the positions indicated by the updated position data.

Figure 12:
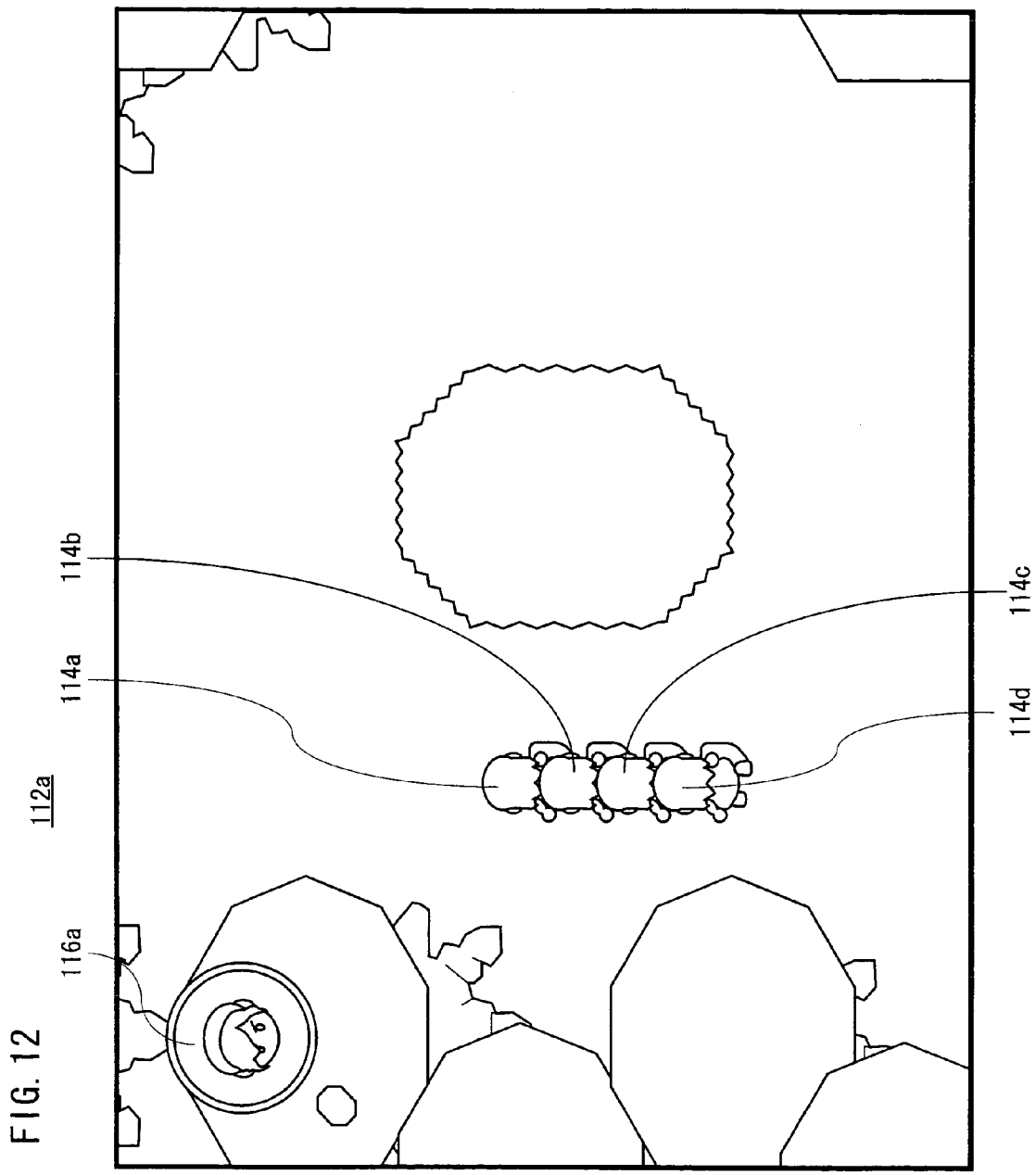
FIG. 12 is an illustrative view showing another example of the 1P screen during the game.

When the player selects a long formation and confirms the selection in the formation selection screen 150, the 1P screen 112a appears on the monitor 34 as shown in FIG. 12. In this long formation, the movements of the other player characters 114b, 114c and 114d are controlled (the position data are updated) in such a way as to utilize common X-coordinate data (an X-coordinate value) comprising the position data on the first player character 114a. That is, the horizontal positions of these player characters are aligned in the 1P screen 112a. However, as for a Z direction (vertical direction in the 1P screen 112a), their positions are shifted by a predetermined amount with respect to the player character 114a so that they are vertically aligned in a row as shown in FIG. 12. In other words, their Z-coordinate values are shifted by the predetermined amount. Accordingly, if the player moves the player character 114a in the vertical direction (top-to-bottom or bottom-to-top direction) in the 1P screen 112a, the other player characters 114b, 114c and 114d move in such a way as to follow in the top-to-bottom or bottom-to-top direction. On the other hand, when the player moves the player character 114a in the horizontal direction (side-to-side direction) in the 1P screen 112a, the player characters 114a to 114d move horizontally in the vertically aligned state.

Figure 13:
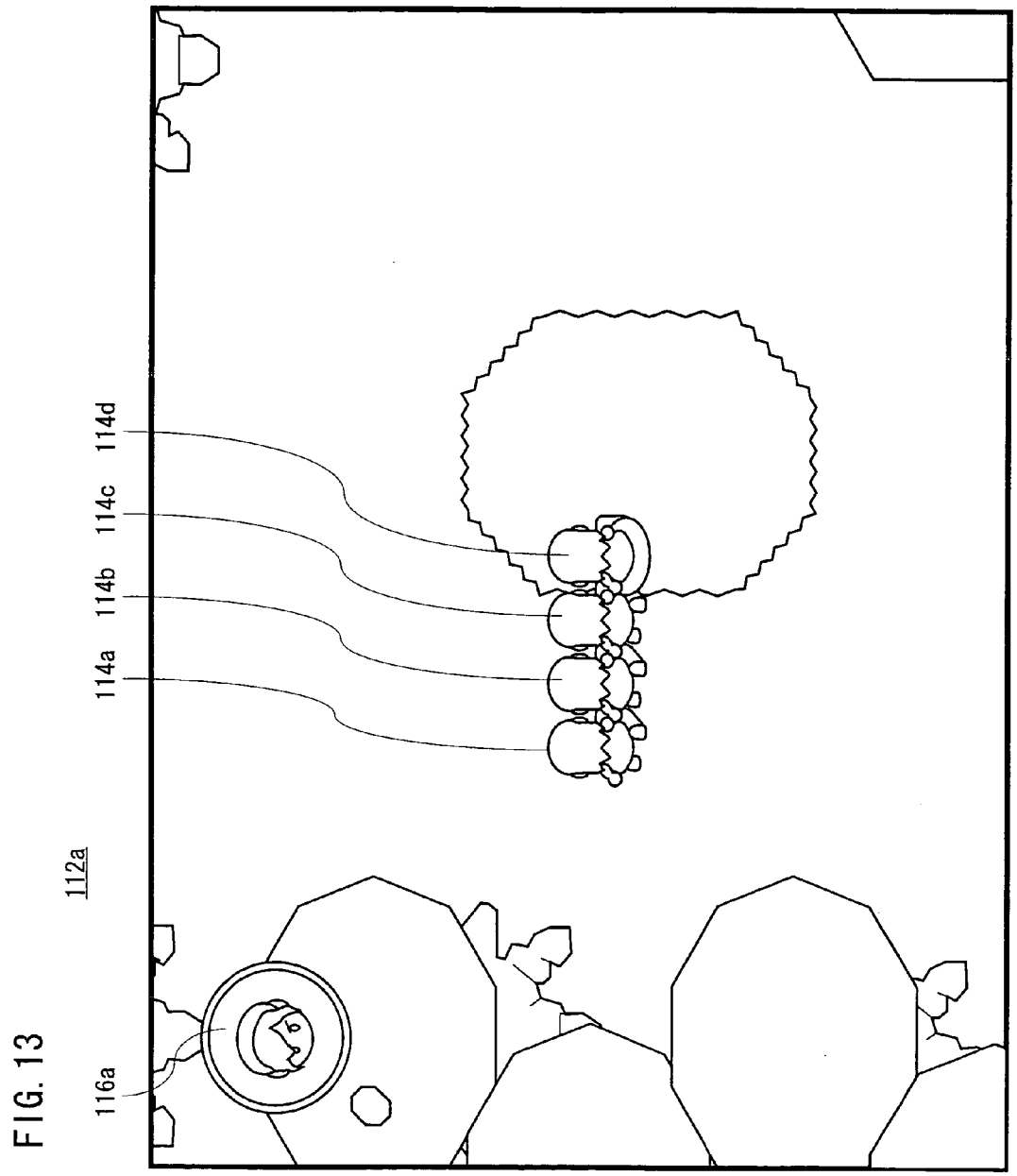
FIG. 13 is an illustrative view showing still another example of the 1P screen during the game.

In addition, when the player selects a wide formation and confirms the selection in the formation selection screen 150, the 1P screen 112a appears on the monitor 34 as shown in FIG. 13. In this wide formation, the movements of the other player characters 114b, 114c and 114d are controlled (e.g., the position data are updated) in such a way as to utilize common Z-coordinate data (a Z-coordinate value) comprising the position data on the first player character 114a. That is, their vertical positions are aligned in the 1P screen 112a. However, as for an X direction (horizontal direction), their positions are shifted by a predetermined amount with respect to the player character 114a so that they are horizontally aligned in a row as shown in FIG. 13. In other words, their X-coordinate values are shifted by the predetermined amount. Accordingly, if the player moves the player character 114a in the vertical direction (top-to-bottom or bottom-to-top direction) in the 1P screen 112a, the other player characters 114b, 114c and 114d move in the horizontally aligned state in the top-to-bottom or bottom-to-top direction. On the other hand, if the player moves the player character 114a in the horizontal direction (side-to-side direction) in the 1P screen 112a, the player characters 114a to 114d are shifted from side to side so as to follow.

Figure 14:
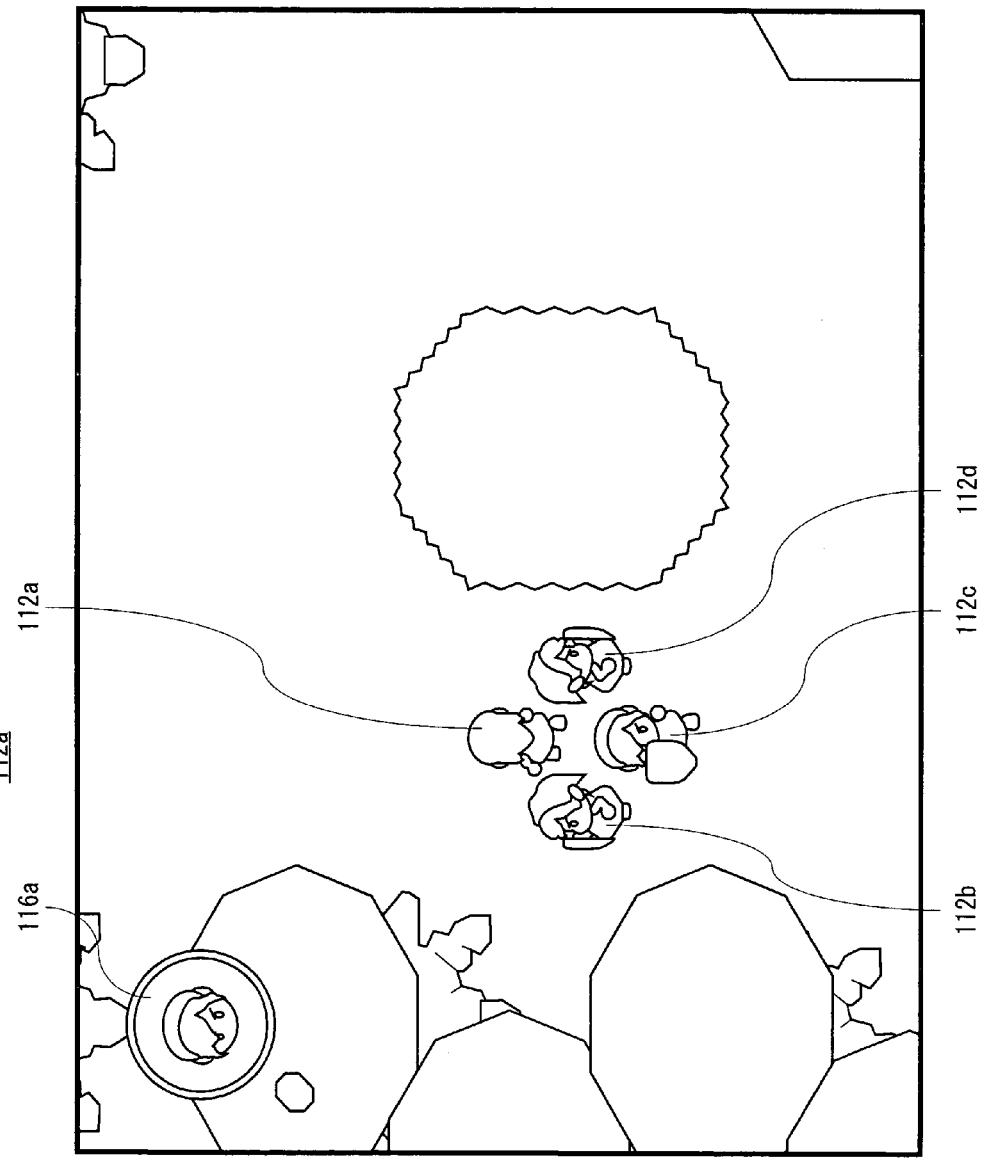
FIG. 14 is an illustrative view showing yet another example of the 1P screen during the game.

Additionally, when the player selects a diamond formation and confirms the selection in the formation selection screen 150, the 1P screen 112a appears on the monitor 34 as shown in FIG. 14. In this diamond formation, the movements of the player characters 114a to 114d are controlled in the state that forms a rhombus (diamond) with one of vertexes in the positions (e.g., position coordinates) indicated by the position data on the first player character 114a. More specifically, after the position data for making the diamond formation have been firstly calculated with respect to the position data on the player character 114a, the player character 114a moves to a position responsive to the operation of the player (the position data 980b is updated), and the other player characters 114b, 114c and 114d shift in parallel with the movement of the player character 114a (e.g., the position data are updated). However, as can be seen in FIG. 14, the player characters 114a to 114d are arranged back to back in this diamond formation.

Figure 15:
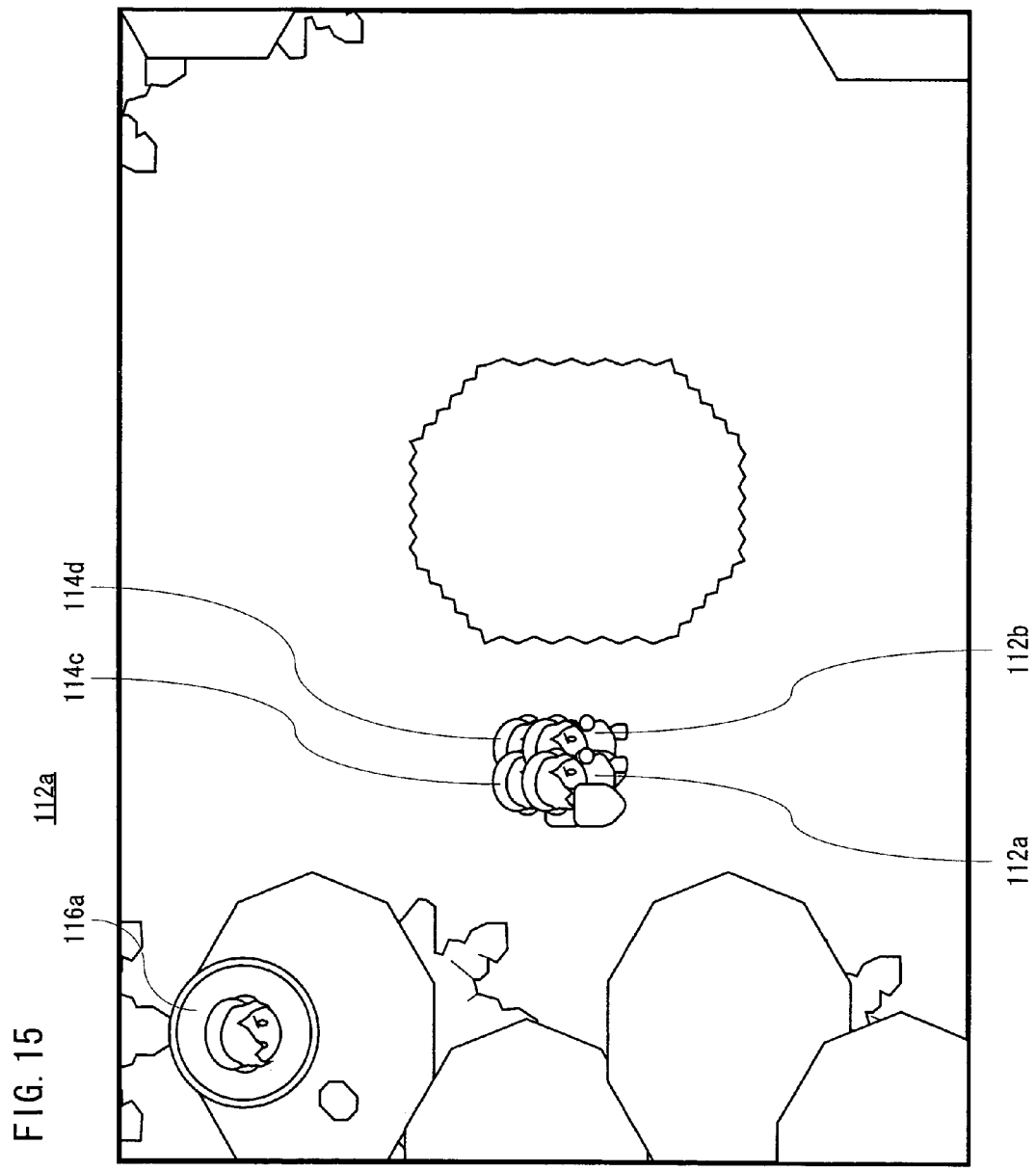
FIG. 15 is an illustrative view showing another example of the 1P screen during the game.

Also, when the player selects a quad formation and confirms the selection in the formation selection screen 150, the 1P screen 112a appears on the monitor 34 as shown in FIG. 15. In this quad formation, the movements of the player characters 114a to 114d are controlled in the state that forms a quad (square in this exemplary illustrative embodiment) with one of the vertexes in the positions (e.g., position coordinates) indicated by the position data on the first player character 114a. More specifically, after the position data for making the quad formation have been firstly calculated with respect to the position data on the player character 114a, the player character 114a moves to a position responsive to the operation of the player (the position data 980b is updated), and the other player characters 114b, 114c and 114d shift in parallel with the movement of the player character 114a (e.g., the position data are updated). As can be seen in FIG. 15, the player characters 114a to 114d are arranged in two rows in this quad formation.

In this way, the player can move the player characters 114a to 114d and cause them to fight a battle with enemy characters in the 1P mode, by selecting various formations during the game according to the complexion of the game. Thus, when moving the player characters 114a to 114d and bringing them into a battle with enemy characters, for example, the player can play the game while contemplating how to proceed with the game and contriving a strategy (formation) for defeating enemy characters.

Although not illustrated, in the case of moving through a labyrinthine passage, it is advisable to select the follow-up formation and lead with the first player character 114a followed by the other player characters 114b, 114c and 114d.

Figure 16:
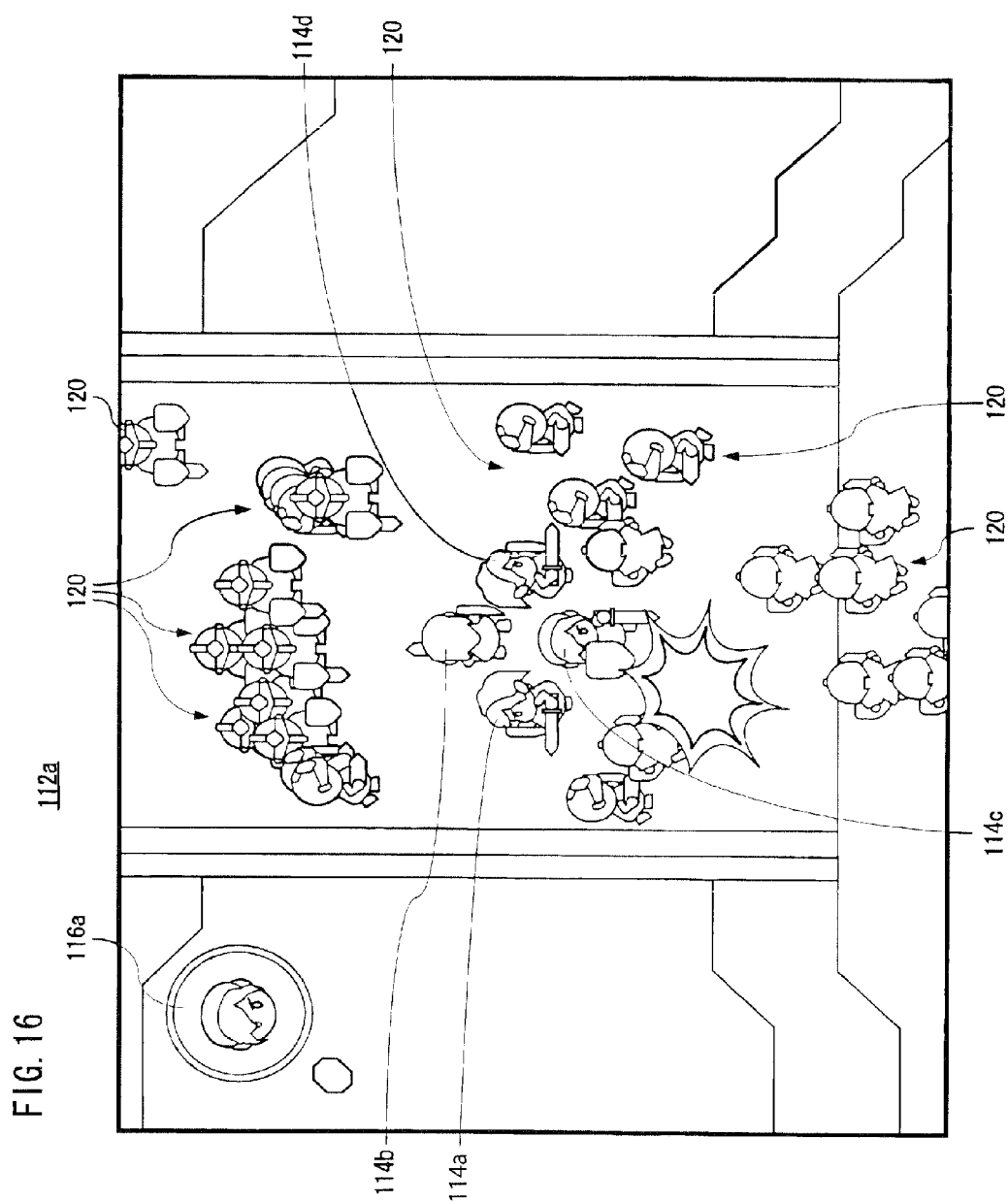
FIG. 16 is an illustrative view showing one example of the 1P screen under a battle during the game.

FIG. 16 shows a game screen (1P screen 112a) during a battle in the 1P mode. In this 1P screen 112a, the player characters 114a to 114d making the diamond formation are displayed in the approximate middle of the 1P screen 112a, and a plurality of enemy characters 120 are positioned around them (on all sides). For the case where the enemy characters 120 come out from all sides of the player characters 114a to 114d, it is advisable to select the diamond formation in order to defeat the enemy characters 120 in an effective manner.

Also, although not illustrated, in the situation where the enemy characters 120 appear from either the left side or right side of the 1P screen 112a, for example, it is advisable to select the long formation shown in FIG. 12 in order to defeat the enemy characters 120 in an effective manner.

In addition, although not illustrated, in the situation where the enemy characters 120 appear from either the upper side or the lower side of the 1P screen 112a, for example, it is advisable to select the wide formation shown in FIG. 13 in order to defeat the enemy characters 120 in an effective manner.

In the 2P mode, each of two players is assigned two player characters at the start of the game as described above. During the game, either of the players can plunder a player character assigned to the other player. However, as a strategy for fighting against the enemy characters 120, the number of player characters may be intentionally changed through discussions between the two players.

Figure 17:
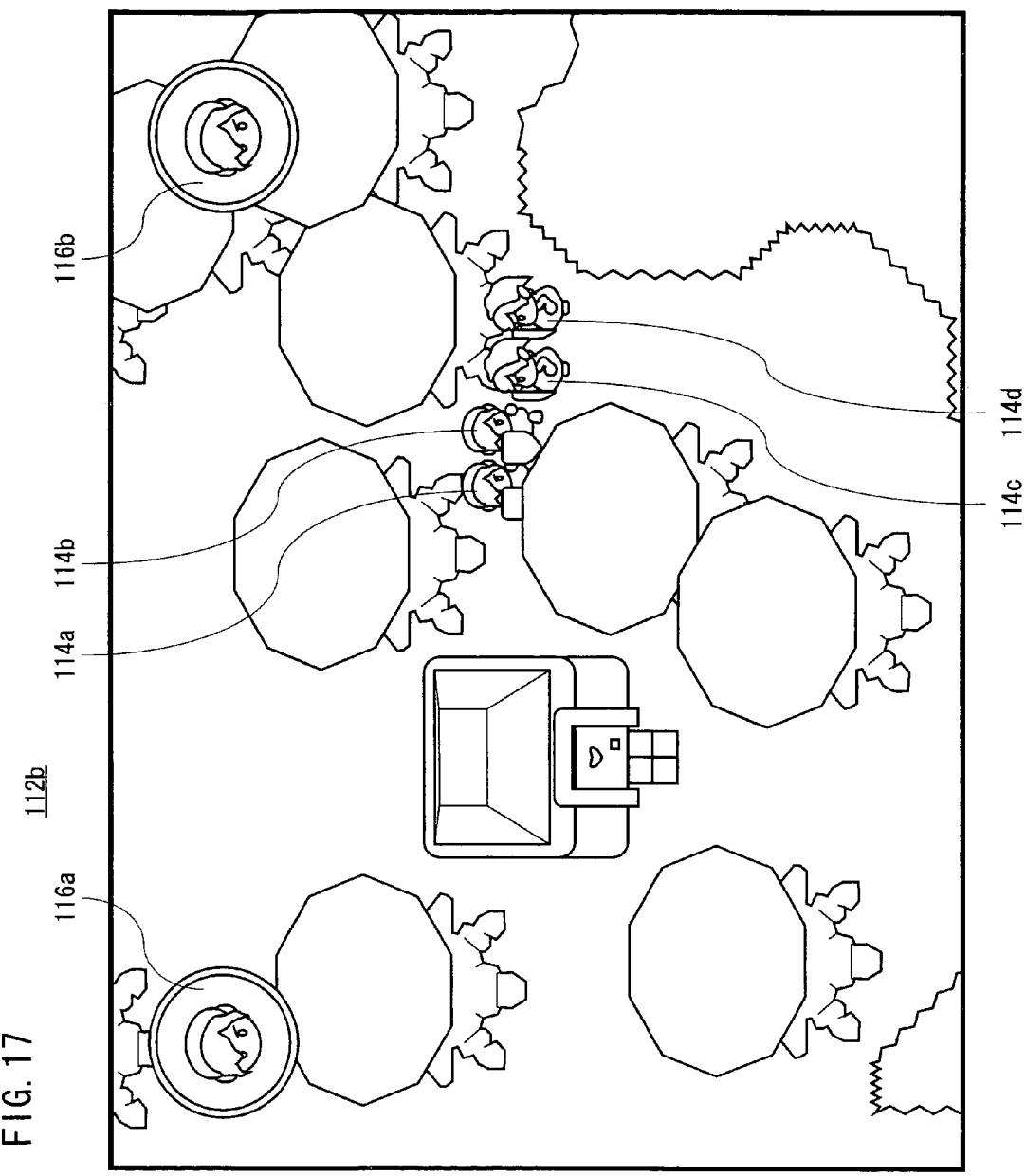
FIG. 17 is an illustrative view showing one example of the 2P screen during the game.

FIG. 17 is an illustrative view showing one example of the 2P screen 112b during the game in the 2P mode. As described above, in the 2P mode, the player characters 114a and 114b are assigned to the 1P, and the player characters 114c and 114d are assigned to the 2P at the start of the game. During the game, in accordance with the operation of the 1P, the formation is selected for the player characters 114a and 114b, and the two player characters in the selected formation move forward or battle with the enemy characters 120. Also, in accordance with the operations of the 2P, the formation is selected for the player characters 114c and 114d, and the two player characters in the selected formation move forward and battle against the enemy characters 120.

Figure 18:
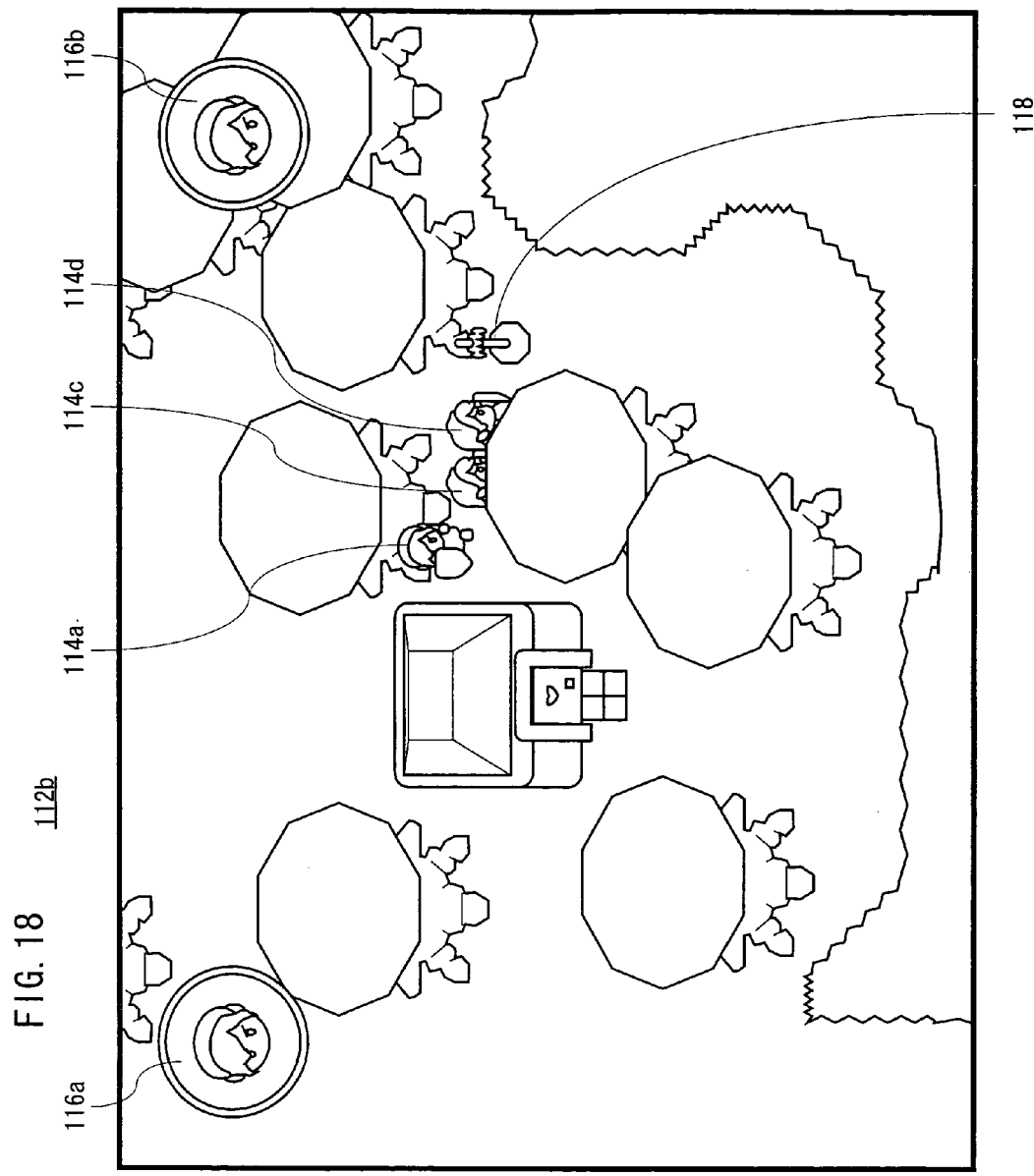
FIG. 18 is an illustrative view showing another example of the 2P screen during the game.
Figure 19:
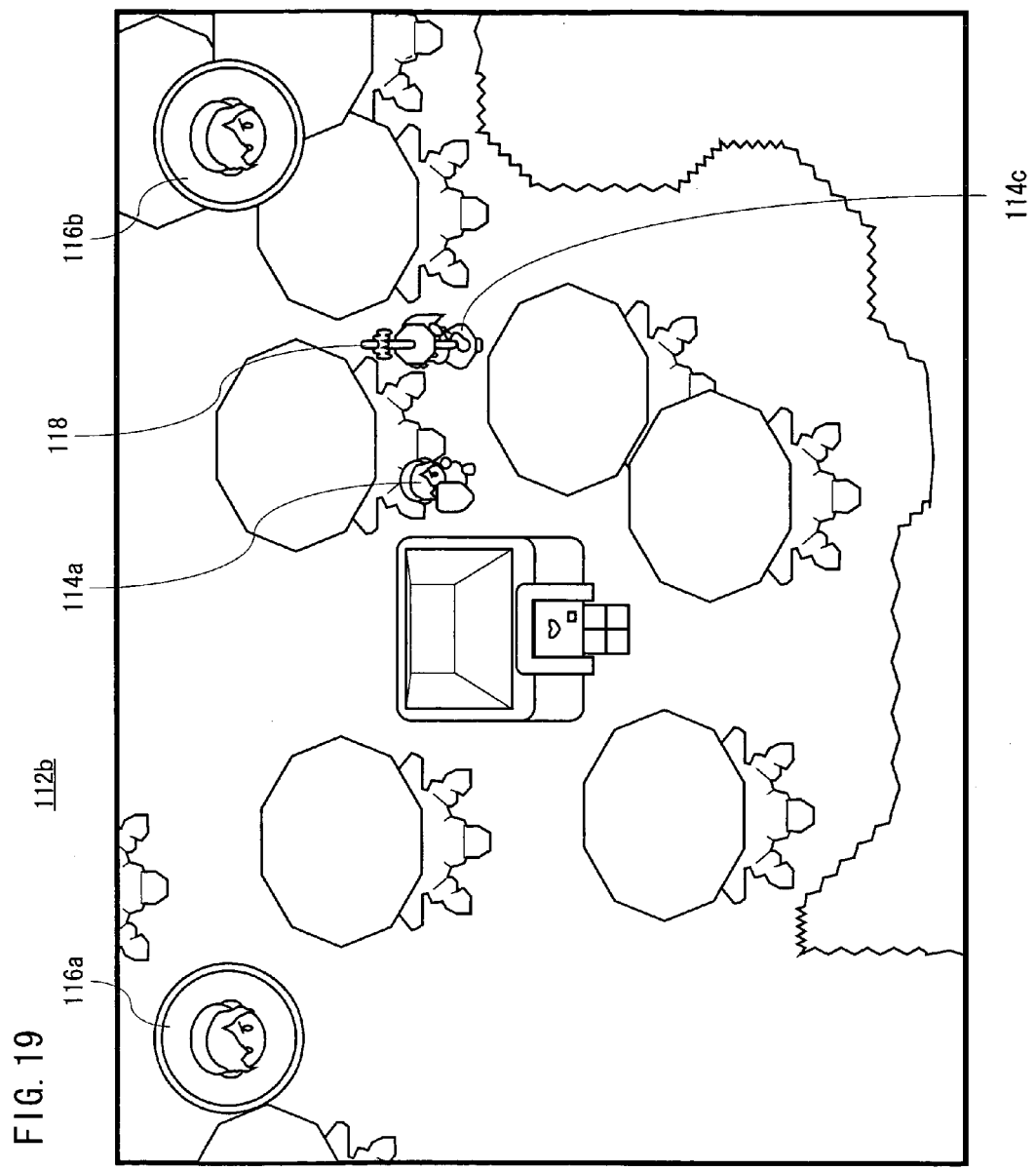
FIG. 19 is an illustrative view showing still another example of the 2P screen during the game.
Figure 20:
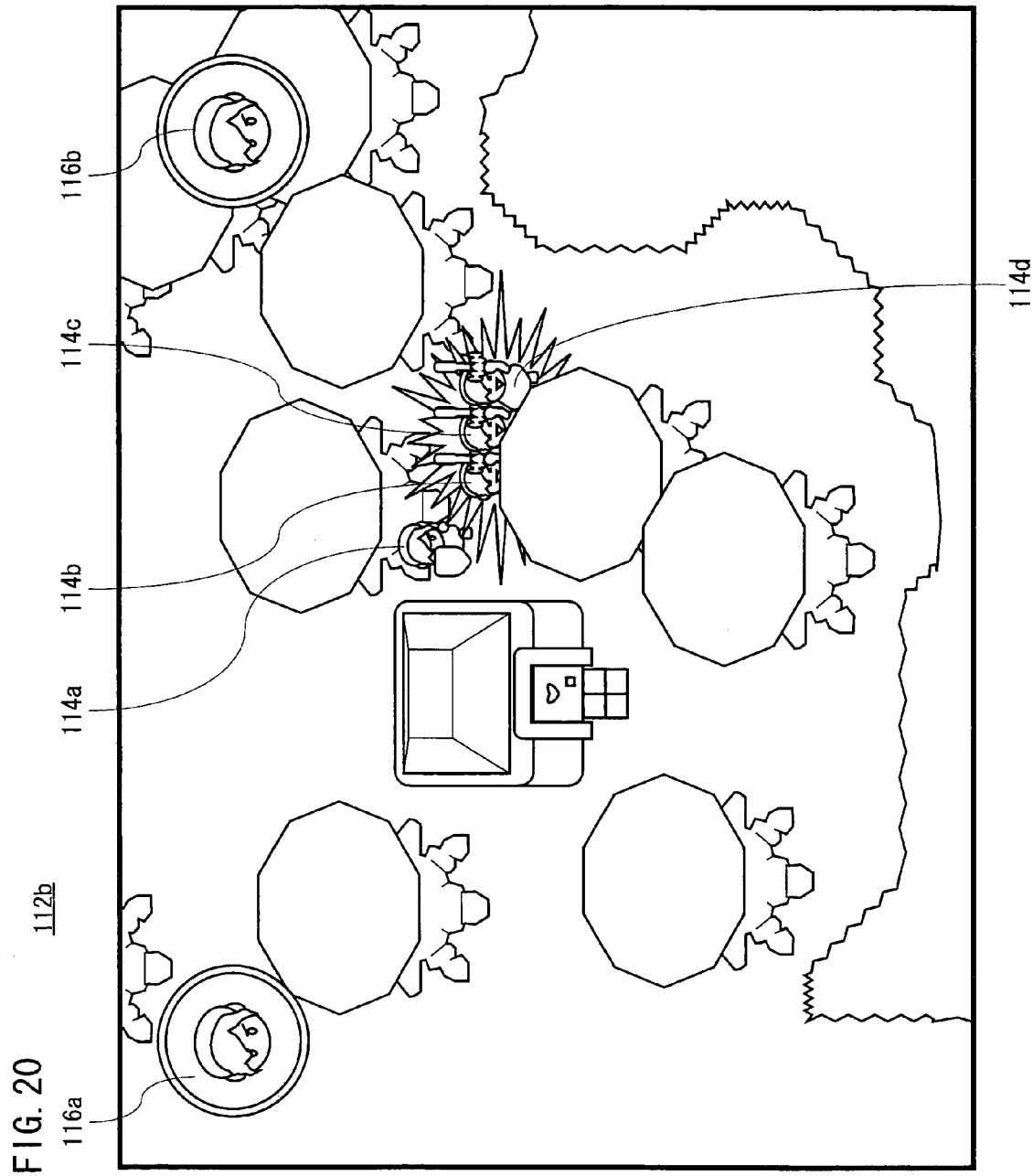
FIG. 20 is an illustrative view showing yet another example of the 2P screen during the game.

Additionally, if a predetermined event occurs during the game, either of the player characters operated by the 1P or 2P (here, the player character 114b assigned to the 1P) changes into the sword 118, and the sword 118 gets stuck in the ground as shown in FIG. 18. In this situation, when one of the players (the 2P here) moves the player characters 114c and 114d to pull out (acquire) the sword 118 as shown in FIG. 19, the player character 114b corresponding to the sword 118 is added to the array of the player characters 114c and 114d operated by the 2P as shown in FIG. 20. At this time, the first player data 960 and second player data 962 are updated. More specifically, the number-of-characters data 960a contained in the first player data 960 is set (updated) to "00", and the assigned character specification data 960b in the first player data 960 is updated to "1000". In addition, the number-of-characters data contained in the second player data 962 is updated to "10", and the assigned character specification data in the second player data 962 to "0111".

After that, therefore, the 1P operates the player character 114a, and the 2P operates the player characters 114b, 114c and 114d. However, when the predetermined event occurs and the players scramble for the sword 118 with the further progress of the game, the 1P and 2P may operate equally their own two player characters, or the 1P operates three player characters and the 2P operates one player character.

Although it is explained above that formation selection is available even in the 2P mode, this is applicable only in the case where one player operates two or three player characters. However, depending on the number of player characters operated, if the diamond formation or quad formation is selected, the two or three player characters need to constitute part of that formation by themselves. Thus, the 1P and 2P are required to make the diamond formation or quad formation through control of the positions of the player characters 114a to 114d. The other formations can be also made even by two or three player characters as in the case of the 1P mode. Since either the 1P or the 2P independently operates one or three assigned player characters, various formations can be employed, not just the ones presented in the explanation of the 1P mode.

In the 3P mode, although not illustrated, since three players exist for the player characters 114a to 114d, the players scramble for one player character (e.g., the player character 114d), or the number of player characters may be intentionally changed through discussions among the players as a strategy for battle against the enemy characters 120, as in the case with the 2P mode. Also, each of the 1P, 2P and 3P independently operates one or two assigned player characters, and thus various formations can be employed, besides the ones described in the explanation of the 1P mode. In those occasions as well as in the case of the 2P mode, the player operating two player characters can choose any one of the formations shown in the explanation of the 1P mode. However, if the diamond formation or quad formation is selected, two player characters need to constitute part of that formation by themselves as in the case of the 2P mode.

Moreover, in the 4P mode, although not illustrated, the player characters 114a to 114d each are operated by different players and so the movements of the player characters 114a to 114d are determined through discussions among the players. Also, in the case of a battle against the enemy characters 120, each of the player characters 114a to 114d is moved and placed in such a way as to make the formation decided through discussions by the players. That is, since each of the 1P to 4P independently operates one assigned player character, it is possible to employ various formations, not just the ones presented in the explanation of the 1P mode.

As mentioned above, this exemplary illustrative embodiment of an action RPG allows player(s) to enjoy the game regardless of the number of players. Also, the game is supposed to be played by operating all the player characters 114a to 114d regardless of the number of player(s), and thus no advantages or disadvantages occur from a difference in the number of player(s).

Figure 21:
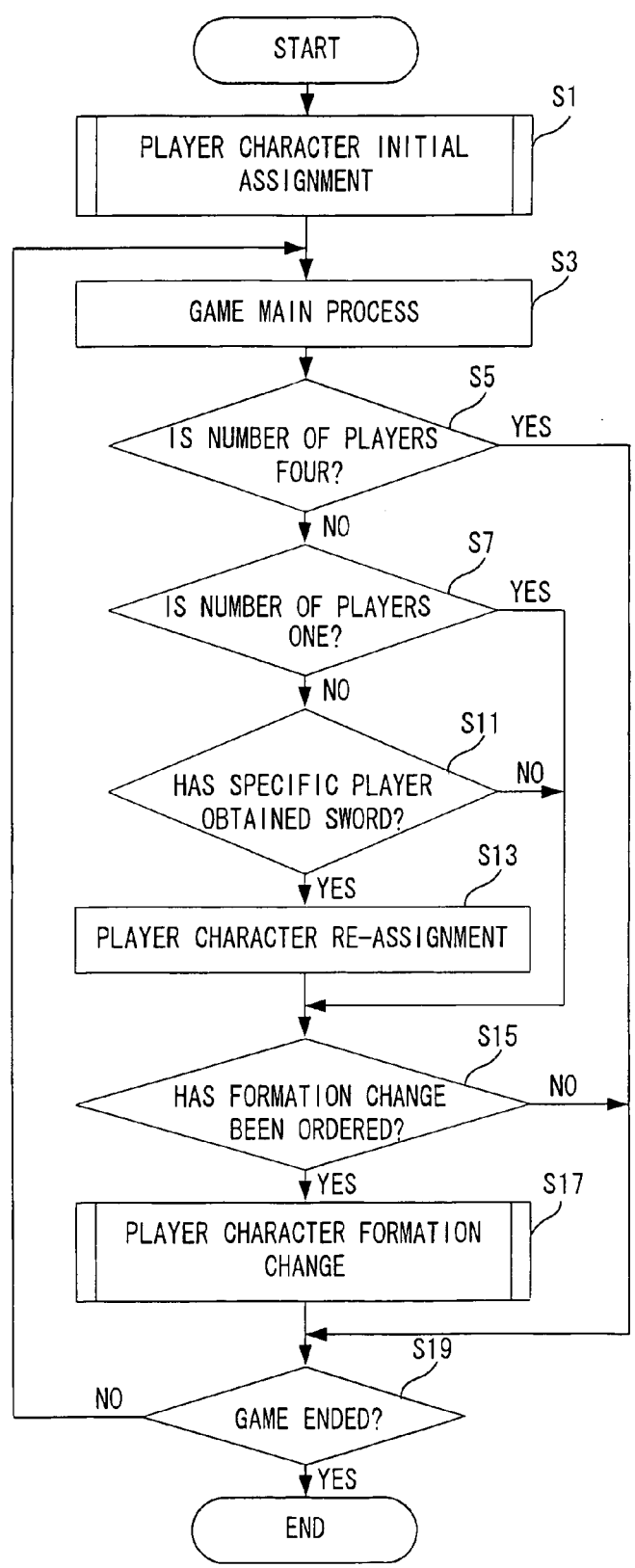
FIG. 21 is a flowchart showing a game process of a CPU shown in FIG. 2.

The operations described above are processed by the CPU 36 shown in FIG. 2 according to the flowcharts provided in FIG. 21 to FIG. 24. FIG. 21 is a flowchart showing the game process of the CPU 36 described in FIG. 2. After starting the game process, the CPU 36 executes a player character initial assignment process described later (see FIG. 22) in step S1, and performs a game main process in step S3. The game main process is performed in order to update background images and player characters' positions, produce sounds required for the game, and save game data (e.g., in a temporary storage) with the progress of the game.

In succeeding step S5, it is determined whether the number of players is four or not. More specifically, it is determined whether or not the players have selected "Play by four" in the play mode selection screen 110. If the number of the players is four, the result is "YES" and the process moves directly to step S19. On the other hand, if the number of players is not four, the result is "NO" and it is determined in step S7 whether the number of the players is one or not. More specifically, it is determined whether or not the player has selected "Play by one" in the play mode selection screen 110. If "YES" is the result of step S7, that is, if the number of players is one, the process proceeds directly to step S15. On the other hand, if "NO" is the result of step S7, that is, if the number of players is two or three, it is determined whether or not a specific (certain) player has obtained a specific item (the sword 118 in this embodiment), that is, whether or not a predetermined requirement has been fulfilled.

If "NO" is the result of step S11, that is, if the certain player has not obtained the sword 118, the process proceeds directly to step S15. On the other hand, if "YES" is the result of step S11, that is, if the certain player has acquired the sword 118, the player characters are re-assigned in step S13 and the process moves on to step S15.

In step S15, it is determined whether a formation change has been ordered or not. That is, it is determined whether or not the player has selected a desired formation and confirmed the selection in the formation selection screen 150. If "NO" is the result here, that is, if the formation change has not been ordered, the process proceeds directly to step S19. On the other hand, if "YES" is the result, that is, if the formation change has been ordered, a player character formation change process to be described later (see FIG. 23 and FIG. 24) is executed in step S17, and the process moves on to step S19.

It is noted that, as can be seen from the flowchart in FIG. 21, if the 4P mode is selected, each player operates one player character and formations cannot be changed from the formation selection screen 150. In other words, formation change can be done (activated) from the formation selection screen 150 only if the 1P mode, 2P mode or 3P mode is selected. However, if only one player character is operated in the 2P mode or 3P mode, formation change cannot be done by using the formation selection screen 150 as in the case of the 4P mode.

In step S19, it is determined whether the game is ended or not. That is, it is determined whether or not to end the game because the game is over or the player has provided an instruction to end it. If "NO" is the result of step S19, that is, if the game is not to be ended, the process returns directly to step S3. On the other hand, if "YES" is the result of step S19, that is, if the game is to be ended, the game process is ended.

Figure 22:
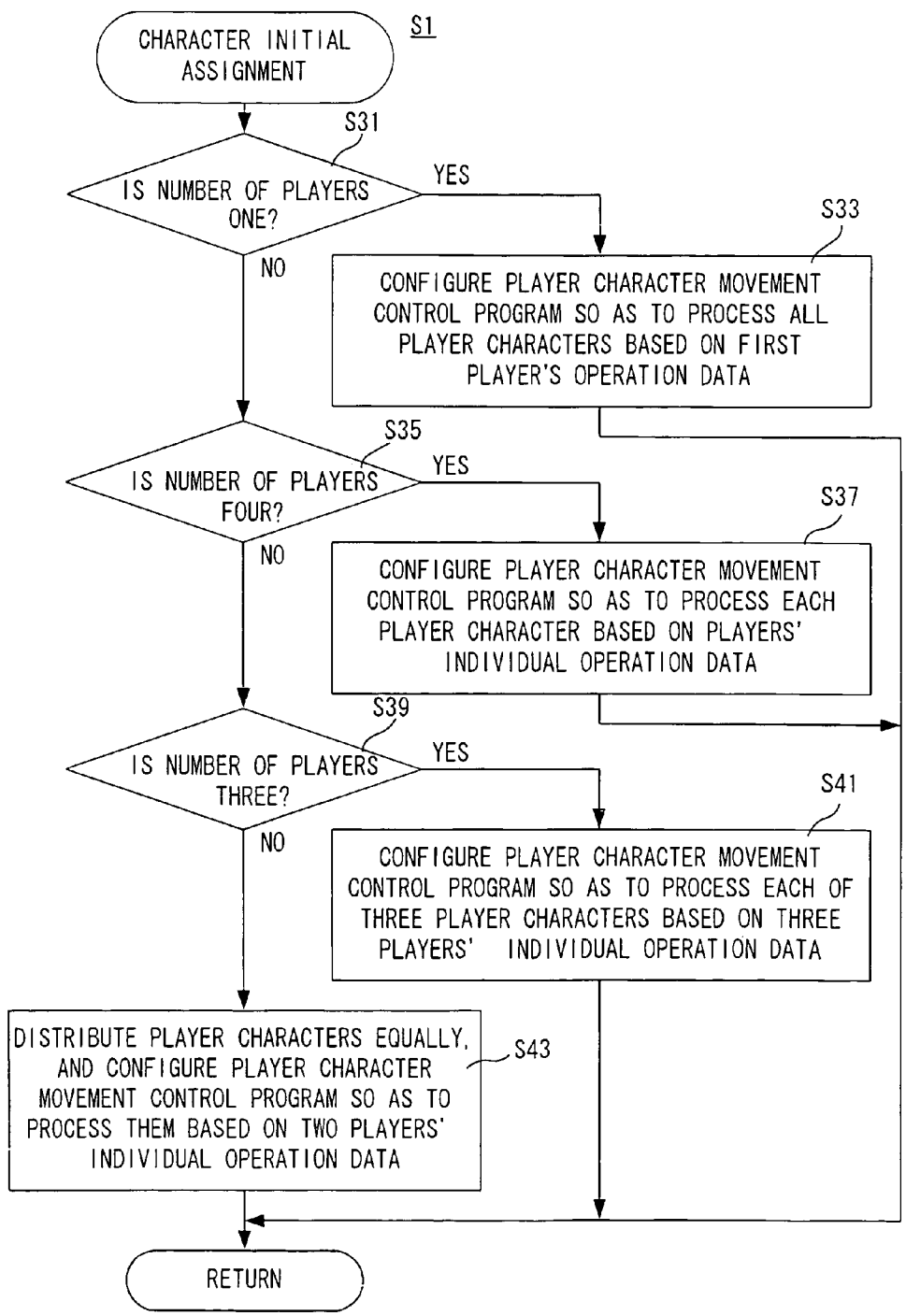
FIG. 22 is a flowchart showing a character initial assignment process of the CPU shown in FIG. 2.

After the player character initial assignment process of step S1 shown in FIG. 21 has started, it is determined in step S31 whether the number of players is one or not, as shown in FIG. 22. If "YES" is the result of step S31, that is, if the number of players is one, the player character movement control program 90 is set in such a manner that all the player characters 114a to 114d are processed according to the first player operation data 960c in step S33, and the player character initial assignment process is returned. However, if "NO" is the result of step S31, that is, if the number of players is not one, it is determined whether the number of players is four or not in step S35.

If "YES" is the result of step S35, that is, if the number of players is four, the player character movement control program 90 is set in such a manner that each of the player characters 114a to 114d is processed according to each player's individual operation data in step S37, and then the player character initial assignment process is returned. More specifically, as mentioned above, the player character 114a is assigned to the 1P, the player character 114b to the 2P, the player character 114c to the 3P, and the player character 114d to the 4P in step S37. However, if "NO" is the result of step S35, that is, if the number of players is not four, it is determined whether the number of players is three or not in step S39.

If "YES" is the result of step S39, that is, if the number of players is three, the player character movement control program 90 is set in such a manner that each of the three player characters is processed according to the three players' individual operation data in step S41, and the player character initial assignment process is returned. More specifically, as mentioned above, the player character 114a is assigned to the 1P, the player character 114b is assigned to the 2P, and the player character 114c is assigned to the 3P in step S41.

On the other hand, if "NO" is the result of step S39, that is, if the number of players is two, the player characters are evenly distributed to the two players, and the player character movement control program 90 is set in such a manner that each of the two player characters is processed according to the two players' individual operation data in step S43, and the player character initial assignment process is returned. More specifically, as mentioned above, the player characters 114a and 114b are assigned to the 1P, and the player characters 114c and 114d are assigned to the 2P in step S43.

Figure 23:
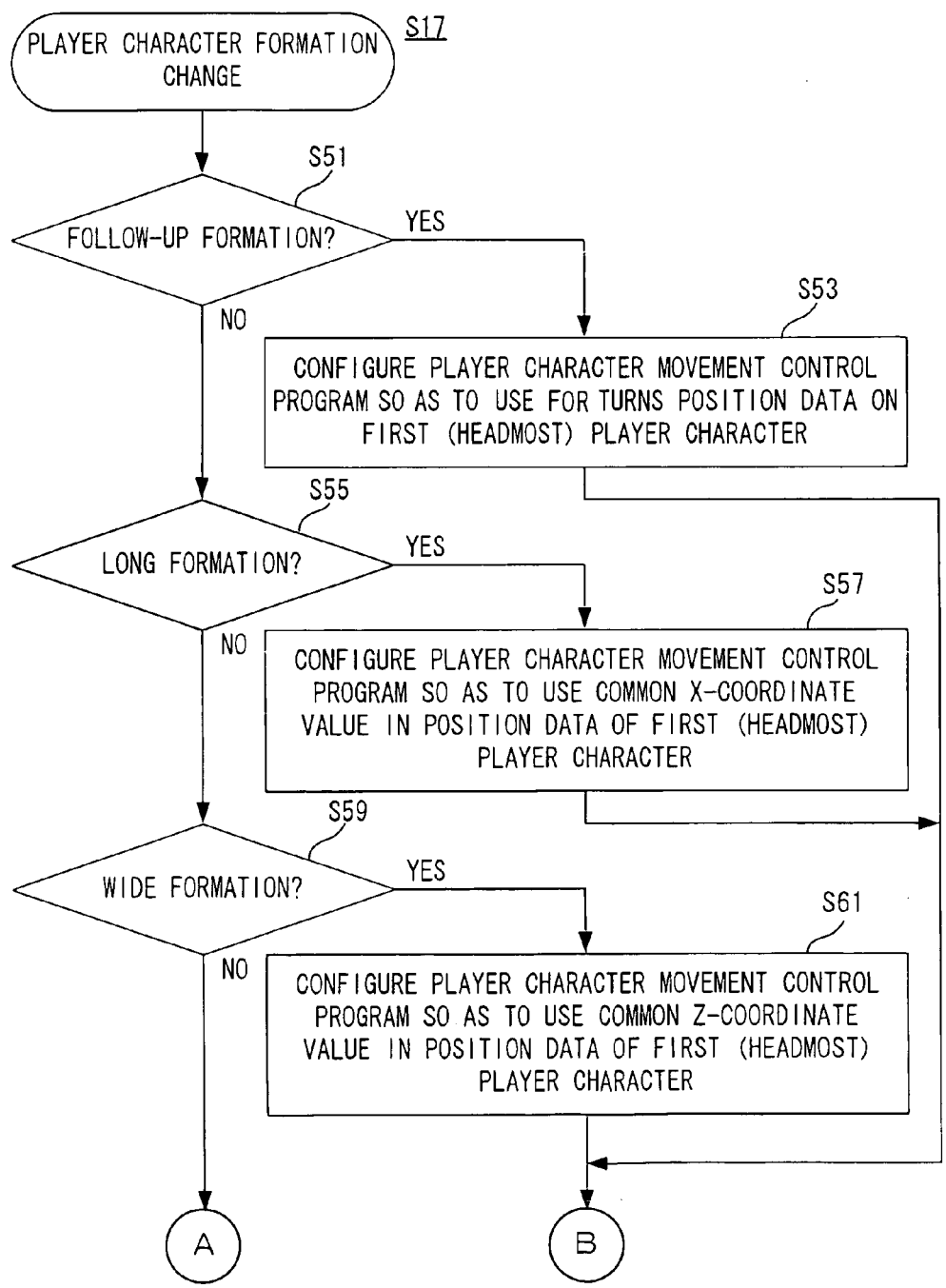
FIG. 23 is a flowchart showing one part of a player character formation change process of the CPU shown in FIG. 2.
Figure 24:
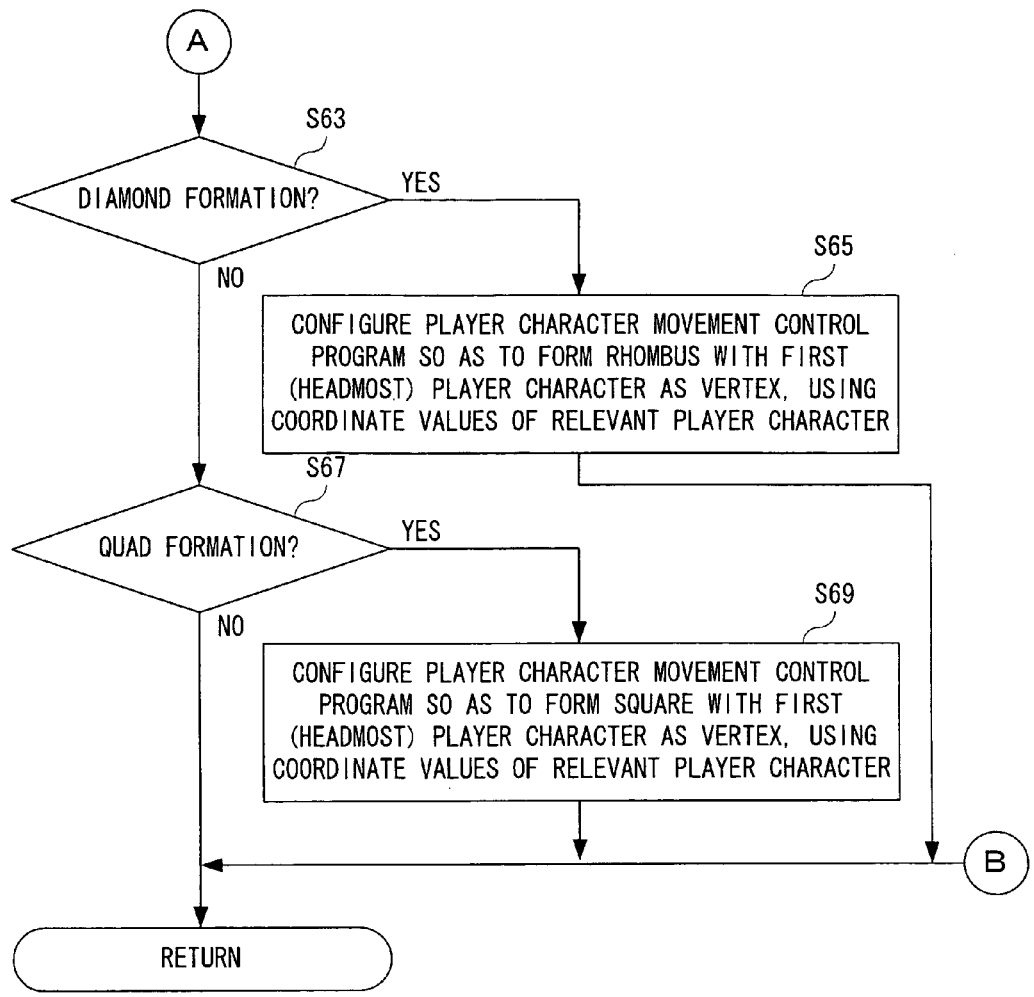
FIG. 24 is a flowchart showing another part of the player character formation change process of the CPU shown in FIG. 2.

In addition, after the player character formation change process has started in step S17 shown in FIG. 21, it is determined in step S51 whether or not the follow-up formation has been specified as shown in FIG. 23. If "YES" is the result of step S51, that is, if the follow-up formation has been specified, the player character movement control program 90 is set in such a manner that the position data on the first (headmost) player character is used in step S53 for turns, and the player character formation change process is returned as shown in FIG. 24.

On the other hand, if "NO" is the result of step S51, that is, if the follow-up formation has not been specified, it is determined in step S55 whether the long formation has been specified or not. If "NO" is the result here, that is, if the long formation has not been specified, the process proceeds directly to step S59. On the contrary, if "YES" is the result, that is, if the long formation has been specified, the player character movement control program 90 is set in such a manner that the X-coordinate value in the position data on the first (headmost) player character is used in common in step S57, and the player character formation change process is returned.

In step S59, it is determined whether the wide formation has been specified or not. If the wide formation has been specified, the result is "YES" in step S59 and the player character movement control program 90 is set in such a manner that the Z-coordinate value in the position data on the first (headmost) player character is used in common in step S61, and the player character formation change process is returned. However, if the wide formation has not been specified, the result is "NO" in step S59 and it is determined in step S63 shown in FIG. 24 whether the diamond formation has been specified or not.

If "YES" is the result of step S63, that is, if the diamond formation has been specified, the player character movement control program 90 is set in such a manner that a rhombus (diamond shape) with the first (headmost) player character as a vertex is formed using the coordinate values of the first player character in step S65, and the player character formation change process is returned.

On the other hand, if "NO" is the result of step S63, that is, if the diamond formation has not been specified, it is determined in step S67 whether the quad formation has been specified or not. If "NO" is the result of step S67, that is, if the quad formation has not been specified, it is determined that the formation change order has been canceled, and the player character formation change process is directly returned. In contrast, if "YES" is the result of step S67, that is, if the quad formation has been specified, the player character movement control program 90 is set in such a manner that a square with the first (headmost) player character as a vertex is formed using the coordinate values of the first player character in step S69, and the player character formation change process is returned.

According to this exemplary illustrative embodiment, the player characters are assigned according to the number of players playing the game. In addition, by scrambling for a player character or changing formations of player characters in accordance with the number of the players, it is possible to plan and change strategies in response to the progress and development of the game. Therefore, players can enjoy the action game in various ways.

In addition, since the maximum number of operable player characters remains constant regardless of the number of players, any advantages or disadvantages based on the number of players do not occur in playing the action game, and the game does not become more difficult depending on the number of players.

It is noted that the formations shown in this exemplary illustrative embodiment are mere examples, and that, the present invention is not limited to them; other various formations may be made during the game.

Moreover, the game apparatus described in this exemplary illustrative embodiment is provided with a game machine and a monitor separately. This exemplary illustrative embodiment, however, can be also applied to arcade games, mobile game machines, and game apparatuses connected with cell phones having game-playing capabilities, or the like, in a manner so as to allow data communications, all of which are integrated with a monitor. In such a case, for example, one of the cell phones connected in a data communications-allowed manner may be a parent machine and the others can be child machines. The parent device, receiving operation signals from itself and all the child devices, may execute the processes shown in FIG. 21 to FIG. 24, causing the processing results to be reflected in itself, and transmitting the results to all the child machines. Naturally, the parent machine does not always need to execute all of the processes. The same effects as above can be achieved by supplying the same key data to mobile game machines or the like connected in a data communications-allowed manner so as to perform program processes on each mobile game machine or the like. However, this is applicable only if there is no data loss in carrying out communications.

Although the example embodiments presented herein have been described and illustrated in detail, it is clearly understood that the same is by way of illustration and example only and is not to be taken by way of limitation, the spirit and scope of the example embodiment being limited only by the terms of the appended claims.

What is claimed is:

1. A game apparatus comprising at least one controller, a game processor and a display, for playing a game by operating a predetermined number of player characters in real time, said game apparatus further comprising:

number-of-operating-players setter programmed logic circuitry for setting a number of players;

player character control programmed logic circuitry for controlling said predetermined number of player characters based on input from said controller and on said game processor, and for displaying said predetermined number of player characters on said display;

operating player setter programmed logic circuitry for assigning said players to each of said predetermined number of player characters; and comparator programmed logic circuitry for comparing a number of players set by said number-of-operating-players setter programmed logic circuitry with a number of said predetermined number of player characters, wherein when the number of said predetermined number of player characters is larger than the number of said players, said operating player setter programmed logic circuitry assigns any one of the players to operate more than one of said player characters, wherein every player character may be assigned to any one of the players, wherein when two or more player characters are assigned to one of said players, said player character control programmed logic circuitry simultaneously controls said two or more player characters according to the input from the controller operated by said one of players, and wherein said operating player setter programmed logic circuitry further includes re-assignor programmed logic circuitry that, after a first player has been designated to operate a number of player characters, re-assigns the player characters being operated by the first player under a predetermined condition to a second player being assigned to operate a first number of player characters in such a manner that said second player operates a second number of player characters which is different than said first number of player characters, said second number of player characters including player characters previously operated by the first player.

2. The game apparatus according to claim 1, further comprising:
formation selector programmed logic circuitry for selecting a formation of said plurality of player characters, wherein
said formation selector programmed logic circuitry is activated only for the player characters operated by players assigned a plurality of said player characters in accordance with an assignment made by said operating player setter programmed logic circuitry; and
said player character control programmed logic circuitry controls the plurality of player characters when said formation selector programmed logic circuitry is activated, based on the input from said controller and on said game processor so as to make a predetermined formation, and displays the plurality of player characters on said display simultaneously.

3. The game apparatus according to claim 2, wherein
said formation selector programmed logic circuitry selects one of the formations according to a predetermined input from said controller.

4. The game apparatus according to claim 3, wherein
said formation selector programmed logic circuitry displays a list of formations to be selected on said display in accordance with a first input from said controller, and selects one of the formations to be selected from the displayed list in accordance with a second input from said controller.

5. A storage medium storing a game program for a game apparatus comprising at least one controller, a game processor and a display, for playing a game by directly operating a predetermined number of player characters in real time, wherein
said game program causes the processor of the game apparatus to execute:
number-of-operating-players setting for setting a number of players;
player character control for controlling said predetermined number of player characters based on input from said controller and of displaying said predetermined number of player characters on said display;
operating player setting for assigning said players to each of said predetermined number of player characters; and
comparing for comparing the number of players set by said number-of-operating-players setting with a number of said predetermined number of player characters, wherein when the number of said predetermined number of player characters is larger than the number of said players, said operating player setting assigns any one of the players to operate more than one of said player characters, wherein every player character may be assigned to any one of the players, wherein
when two or more player characters are assigned to one of said players, said player character control simultaneously controls said two or more player characters according to the input from the controller operated by said one of players, and wherein
said operating player setting includes a re-assignment that, after a first player has been designated to operate a number of player characters, re-assigns the player characters being operated by the first player under a predetermined condition to a second player being assigned to operate a first number of player characters in such a manner that said second player operates a second number of player characters which is different than said first number of player characters, said second number of player characters including player characters previously operated by the first player.

6. The storage medium storing a game program according to claim 5, wherein
said game program further executes formation selection for selecting a formation of said plurality of player characters, and wherein
said formation selection is activated only for the player characters operated by the player assigned a plurality of said player characters in accordance with an assignment resulting from said operating player setting; and
said player character control controls the plurality of player characters with said formation selection activated, based on the input from said controller, so as to make a predetermined formation, and displays the plurality of player characters on said display simultaneously.

7. The storage medium storing a game program according to claim 6, wherein
said formation selecting selects one of the formations according to a predetermined input from said controller.

8. The storage medium storing a game program according to claim 7, wherein
said formation selecting displays a list of formations to be selected on said display in accordance with a first input from said controller, and selects one of the formations to be selected from the displayed list in accordance with a second input from said controller.

* * * * *